US012793165B2

(12) United States Patent
Xu et al.

(10) Patent No.: US 12,793,165 B2
(45) Date of Patent: Nov. 10, 2026

(54) CONVOLUTION ACCELERATION USING ACTIVATION STATIC VECTORIZATION

(71) Applicant: QUALCOMM Incorporated, San Diego, CA (US)

(72) Inventors: Haoping Xu, North York (CA); Suze Balatsos, Markham (CA); Prajakt Kulkarni, San Diego, CA (US); Brian Varga, Scarborough (CA); Nikolina Askovic, Toronto (CA); Aranksha Normanbhai Patel, Scarborough (CA); Anam Zain, Burlington (CA); Darwin Fan, Maple (CA); Neelkanth Pradhumanbhai Patel, Scarborough (CA); Manoj Shokeen, Markham (CA)

(73) Assignee: QUALCOMM INCORPORATED, San Diego, CA (US)

( * ) Notice: Subject to any disclaimer, the term of this patent is extended or adjusted under 35 U.S.C. 154(b) by 736 days.

(21) Appl. No.: 18/335,854

(22) Filed: Jun. 15, 2023

(65) Prior Publication Data

US 2024/0420276 A1 Dec. 19, 2024

(51) Int. Cl.
*G06T 1/60* (2006.01)
*G06T 1/20* (2006.01)

(52) U.S. Cl.
CPC . *G06T 1/60* (2013.01); *G06T 1/20* (2013.01)

(58) Field of Classification Search
None
See application file for complete search history.

(56) References Cited

U.S. PATENT DOCUMENTS

2019/0138567 A1* 5/2019 Martin .................. G06F 17/153
2021/0182025 A1* 6/2021 Shafiee Ardestani ........................ G06F 7/5443
2023/0116419 A1* 4/2023 Muller .................... G06F 17/16 708/520

FOREIGN PATENT DOCUMENTS

GB 2601466 * 6/2022
GB 2601466 A 6/2022

OTHER PUBLICATIONS

International Search Report and Written Opinion—PCT/US2024/027527—ISA/EPO—Aug. 9, 2024.

* cited by examiner

*Primary Examiner* — Nancy Bitar
(74) *Attorney, Agent, or Firm* — Polsinelli LLP

(57) ABSTRACT

Systems and techniques are provided for processing image data. A respective first value enclosed by a convolution kernel in each position of a plurality of positions of the convolution kernel along a row of the image data can be obtained and stored using a respective memory location associated with each position of the plurality of positions. Based on each respective first value, an accumulated value corresponding to a convolution output for each position of the plurality of positions can be updated. A plurality of second values enclosed by the convolution kernel in each position of the plurality of positions can be obtained. The plurality of second values includes a subset of the respective first values and an additional second value. A memory location used to store a first value not included in the plurality of second values can be updated to store the additional second value.

30 Claims, 10 Drawing Sheets

CONVOLUTION ACCELERATION USING ACTIVATION STATIC VECTORIZATION

FIELD

The present disclosure generally relates to image processing using a machine learning network. For example, aspects of the present disclosure are related to systems and techniques for performing image processing using one or more machine learning systems implementing convolution operations.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network attempts to replicate, using computer technology, logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for image processing. According to at least one illustrative example, a method of processing image data is provided. The method includes: obtaining a respective first value enclosed by a convolution kernel in each position of a plurality of positions of the convolution kernel along a row of the image data; storing each respective first value using a respective memory location associated with each position of the plurality of positions of the convolution kernel; updating, based on each respective first value stored using the respective memory location, an accumulated value corresponding to a convolution output for each position of the plurality of positions of the convolution kernel; obtaining a plurality of second values enclosed by the convolution kernel in each position of the plurality of positions, wherein the plurality of second values includes a subset of the respective first values and an additional second value not included in the respective first values; and updating a memory location used to store a first value not included in the plurality of second values with the additional second value, wherein the updated memory location stores the additional second value.

In another illustrative example, an apparatus for processing image data is provided. The apparatus includes at least one memory and at least one processor coupled to the at least one memory and configured to: obtain a respective first value enclosed by a convolution kernel in each position of a plurality of positions of the convolution kernel along a row of the image data; store each respective first value using a respective memory location associated with each position of the plurality of positions of the convolution kernel; update, based on each respective first value stored using the respective memory location, an accumulated value corresponding to a convolution output for each position of the plurality of positions of the convolution kernel; obtain a plurality of second values enclosed by the convolution kernel in each position of the plurality of positions, wherein the plurality of second values includes a subset of the respective first values and an additional second value not included in the respective first values; and update a memory location used to store a first value not included in the plurality of second values with the additional second value, wherein the updated memory location stores the additional second value.

In another illustrative example, a non-transitory computer-readable storage medium comprising instructions stored thereon which, when executed by at least one processor, causes the at least one processor to: obtain a respective first value enclosed by a convolution kernel in each position of a plurality of positions of the convolution kernel along a row of the image data; store each respective first value using a respective memory location associated with each position of the plurality of positions of the convolution kernel; update, based on each respective first value stored using the respective memory location, an accumulated value corresponding to a convolution output for each position of the plurality of positions of the convolution kernel; obtain a plurality of second values enclosed by the convolution kernel in each position of the plurality of positions, wherein the plurality of second values includes a subset of the respective first values and an additional second value not included in the respective first values; and update a memory location used to store a first value not included in the plurality of second values with the additional second value, wherein the updated memory location stores the additional second value.

In another illustrative example, an apparatus is provided for processing image data. The apparatus includes: means for obtaining a respective first value enclosed by a convolution kernel in each position of a plurality of positions of the convolution kernel along a row of the image data; means for storing each respective first value using a respective memory location associated with each position of the plurality of positions of the convolution kernel; means for updating, based on each respective first value stored using the respective memory location, an accumulated value corresponding to a convolution output for each position of the plurality of positions of the convolution kernel; means for obtaining a plurality of second values enclosed by the convolution kernel in each position of the plurality of positions, wherein the plurality of second values includes a subset of the respective first values and an additional second value not included in the respective first values; and means for updating a memory location used to store a first value not included in the plurality of second values with the additional second value, wherein the updated memory location stores the additional second value.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
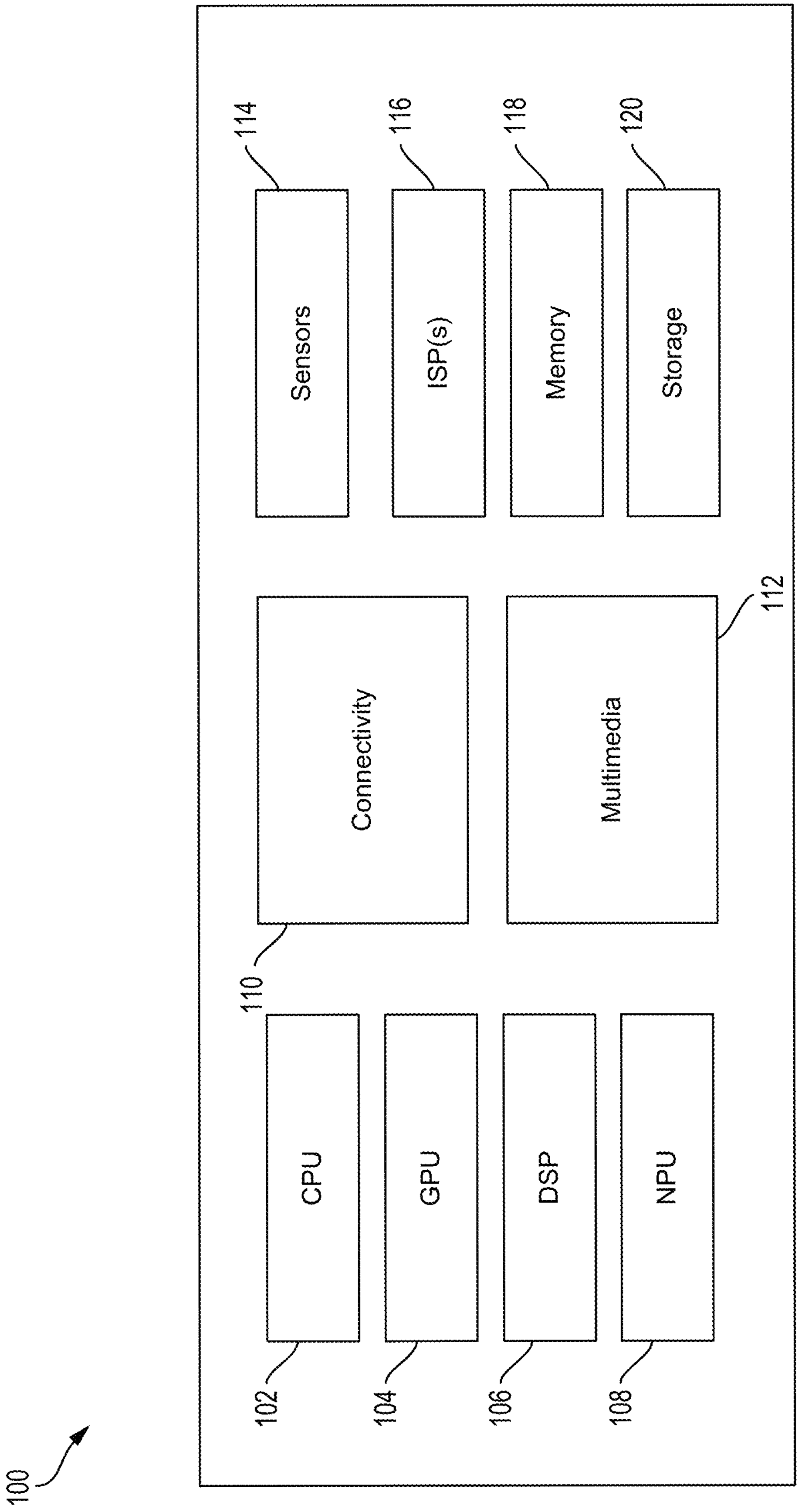
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

As noted above, machine learning systems (e.g., neural network systems or models) can be used to perform a variety of tasks such as, for example and without limitation, detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, and image processing, among other tasks. Moreover, machine learning models can be versatile and can achieve high quality results in a variety of tasks.

In some cases, a machine learning system can be implemented based on performing a plurality of convolution operations (e.g., using one or more convolutional layers). A convolution is an operation on two functions that produces a third function that expresses how the shape of one is modified by the other. Convolutions and/or convolutional layers can be used to process pixel data and may be implemented in various image processing and/or video processing machine learning tasks. As used herein, an "image" or "image data" may refer to a frame of pixel data having a horizontal resolution (e.g., horizontal number of pixels) and a vertical resolution (e.g., vertical number of pixels). The frame of pixel data can be associated with a still image or photograph and/or can be associated with a frame of video data.

Machine learning networks can perform convolutional operations using a convolution kernel or filters that slide along input features to generate a plurality of feature maps. Convolutional operations can be implemented based on the hierarchical nature of the data being processed. For example, instead of processing an entire image or input at once, a convolutional neural network (CNN) breaks the image down into smaller, simpler features, which are represented by filters that are applied to different regions of the image to extract the relevant information (e.g., corresponding feature maps for the different image regions). As the CNN progresses through its convolutional layers, the features maps are combined and assembled into increasingly complex structures that are used to learn increasingly abstract representations of the input.

In an example CNN implementation, the input to the CNN can be a tensor with a shape given by (number of inputs)×(input height)×(input width)×(input channels). For instance, after passing through a convolutional layer, an input image can be abstracted to a feature map (e.g., also referred to as an activation map), with a shape given by: (number of inputs)×(feature map height)×(feature map width)×(feature map channels). The feature map dimensions can be smaller than the input image dimensions. Convolutional layers convolve the input and pass the output result to the next layer. Each convolutional neuron processes data only for its receptive field. In some aspects, convolution can be performed to reduce the number of free parameters in a machine learning network (e.g., by reducing the number of free parameters, the machine learning network can be deeper).

A convolution kernel can be implemented as a matrix of weights that slides over the input data provided to a CNN. For example, a 3×1 convolution kernel can be a 3×1 matrix of weights that slides over the input data. For instance, the 3×1 convolution kernel can be used to process an image based on sliding across the rows of pixels included in the image. At each step, the 3×1 convolution kernel can process three columns of pixels in one row (e.g., 3×1), performing an elementwise multiplication with the respective pixels that are currently included in the 3×1 window of the convolution kernel. The results of the elementwise multiplication are summed into a single output value for the current sliding window of the convolution. The convolution kernel can then repeat the process above for every location the convolution kernel slides over, converting a 2D matrix of a first size into a 2D matrix of a second, smaller size.

As noted previously, convolution operations can be used to implement various machine learning operations, which can include 2D convolutions, 3D convolutions, depthwise convolution, group convolution, trans-convolution (e.g., transposed convolution), etc. Convolution operations can be used for image processing, image segmentation, object detection and/or classification, etc. Convolution operations can be power-intensive and/or computing-intensive operations. For instance, each output data of a convolution operation may be generated based on performing a plurality of multiply-accumulate (MAC) operations. The quantity of MAC operations per output can be based on the convolution type, kernel size, channel size, etc. For instance, a 3×3 convolution with 64 input channels utilizes 3*3*64=576 MAC operations per output data of the convolution operation (e.g., the element-wise multiplication and subsequent summation performed for each step of sliding the 3×3 convolution kernel uses 576 MAC operations).

In some cases, approximately 30% of the total power usage associated with performing convolutional operations may be used by transferring data for local storage (e.g., RAM) to compute units (CUs). For instance, in the above example of a 3×3 convolution with 64 input channels, each output value of the convolution utilizes 576 MAC operations. Each MAC operation needs one byte of activation data and one byte of weight data, and a total of 1,152 bytes of data read may be needed to calculate a single output value of the 3×3 convolution with 64 input channels.

Systems and techniques that can be used to reduce the power consumption and/or computational workload associated with performing convolutional operations may be beneficial. Systems and techniques that can more efficiently perform fetching and transfer of data associated with convolution operations can also be beneficial. Reducing the quantity of data fetches (e.g., data reads) and/or data transfers associated with convolution operations can also beneficial.

Systems, apparatuses, processes (also referred to as methods), and computer-readable media (collectively referred to as "systems and techniques") are described herein for processing images (e.g., image data or video data) using convolutional machine learning networks. For example, a convolutional machine learning network (e.g., CNN) can perform convolution without performing a full refresh of the input data provided at each clock cycle of the convolution. In some aspects, the systems and techniques can be used to perform convolution with reduced data toggling. For instance, the systems and techniques described herein can be used to perform image processing using convolution operations with a reduced number of data reads and/or a reduced number of data transfers. In some aspects, the systems and techniques can utilize static data locations for input data that is persisted for multiple cycles of the convolution operation. For example, an input data that is included in a second location (e.g., second from left location) of a first position of a convolution kernel and a first location (e.g., leftmost location) of a second position of a convolution kernel can be stored in the same memory location(s) associated with performing multiplier-accumulator (MAC) operations for a first convolution cycle corresponding to the first location of each convolution kernel position for a row of input data (e.g., image data) and a second convolution cycle corresponding to the second location of each convolution kernel position for the row of input data.

In some examples, at least a portion of the memory location(s) used to store respective input data for a particular convolution cycle can be static memory locations that are reused for multiple convolution cycles, based on the respective input data being enclosed (e.g., processed) by a convolution kernel position corresponding to the particular convolution cycle and being enclosed by a convolution kernel position corresponding to a next convolution cycle. In some cases, a memory location used to store input data that is enclosed by a convolution kernel position associated with the current convolution cycle and not enclosed by a convolution kernel position associated with the next convolution cycle can be replaced (e.g., overwritten) by input data that is enclosed by a convolution kernel position associated with the next convolution cycle and is not enclosed by a convolution kernel position associated with the current convolution cycle. In some examples, the replaced input data can be located at a trailing edge of the convolution kernel in the current convolution cycle and the replacement input data can be located at a leading edge of the convolution kernel in the next convolution cycle.

The static data locations can be associated with local storage (e.g., RAM, cache, other memory, etc.) of a compute unit (CU) that is used to implement the convolution operations. For instance, a particular pixel of an input image can be used to calculate multiple different output location values of the convolution (e.g., a particular pixel can be included in multiple different sliding window positions of the convolution kernel). In some aspects, the systems and techniques can store pixel data using static locations (e.g., in RAM, cache, other memory, etc.), where the static pixel data is used to determine multiple different output location values of the convolution. For each clock cycle (e.g., each "step" of the sliding convolution kernel), a portion of the static pixel data can be replaced. For example, the portion of the static pixel data that is no longer utilized by any of the MAC operations for the current position of the sliding convolution kernel can be replaced with updated values corresponding to pixels that are newly covered by the current position of the sliding convolution kernel.

In some examples, the input data associated with a particular memory location can be provided to the same multiplier compute unit (CU) in each convolution cycle. The multiplier CU can be used to implement multiplier-accumulator (MAC) operations associated with one or more convolution outputs for a particular row of the input image data. In some cases, each multiplier CU can perform a MAC operation for a different convolution output location in each convolution cycle of a plurality of convolution cycles associated with the particular row of the input image data. For instance, the multiplier CUs can be implemented as shifted or moving multiplier CUs that perform a MAC operation for a different convolution output location in each convolution cycle.

In some cases, each multiplier CU can be associated with a corresponding accumulator or accumulator buffer for storing an accumulated value associated with the MAC operation for a particular convolution output location at each convolution cycle. In some examples, each convolution output location can use the same accumulator or accumulator buffer for each convolution cycle. For instance, a first accumulator or accumulator buffer can correspond to a first convolution output location, and may receive an output from a first multiplier CU in a first convolution cycle, an output from a second multiplier CU in a second convolution cycle, etc. Data switching can be performed between the plurality of multiplier CUs and the plurality of accumulators or accumulator buffers, such that each accumulator or accumulator buffer receives an input from a different multiplier CU for each convolution cycle.

In another example, each multiplier CU can provide output to a different accumulator or accumulator buffer in each convolution cycle. For instance, the multiplier CUs can be implemented as shifted or moving multiplier CUs that perform a MAC operation for a different convolution output location in each convolution cycle and the accumulators can be implemented as shifted or moving accumulators that updated an accumulated value for a different convolution output location in each convolution cycle. In some aspects, the multiplier CUs and accumulators can be shifted by the same amount between each convolution cycle. For example, in a first convolution cycle, a first multiplier CU can provide output to a first accumulator buffer, the output corresponding to a first convolution output location. After the first convolution cycle and before a second convolution cycle, the accumulated value within the first accumulator can be written to and replace an accumulated value within a second accumulator. The second convolution cycle can be performed to update the second accumulator with an output of the second multiplier CU, where both the second multiplier CU and the second accumulator correspond to the second convolution output location in the first convolution cycle and correspond to the first convolution output location in the second convolution cycle.

Various aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In some implementations, the NPU is implemented in the CPU 102, DSP 106, and/or GPU 104. The SOC 100 may also include one or more sensors 114, image signal processors (ISPs) 116, and/or storage 120.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform disparity estimation refinement for pairs of images (e.g., stereo image pairs, each including a left image and a right image). SOC 100 can be part of a computing device or multiple computing devices. In some examples, SOC 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
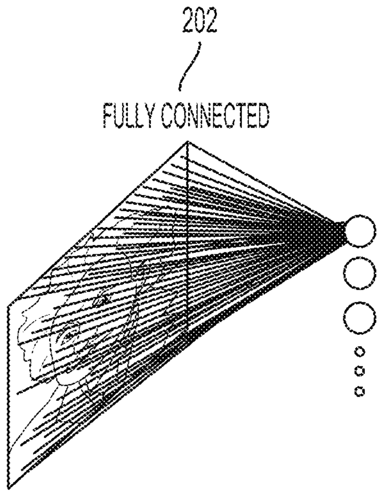
FIG. 2A illustrates an example of a fully connected neural network, in accordance with some examples.
Figure 2B:
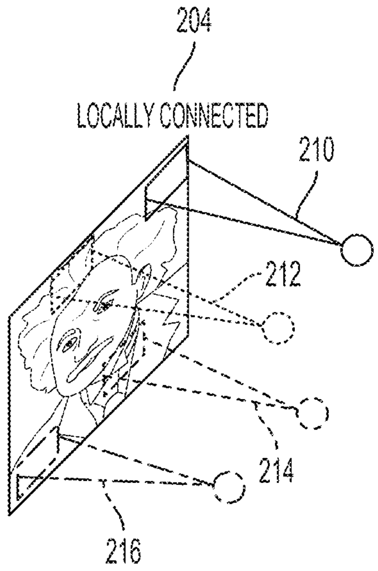
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
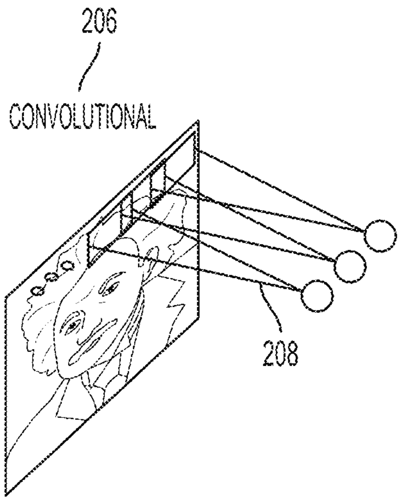
FIG. 2C illustrates an example of a convolutional neural network, in accordance with some examples.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure. An illustrative example of a deep learning network is described in greater depth with respect to the example block diagram of FIG. 8. An illustrative example of a convolutional neural network is described in greater depth with respect to the example block diagram of FIG. 9.

As mentioned previously, the systems and techniques described herein can be used to perform image processing using convolution operations with a reduced number of data reads and/or a reduced number of data transfers. In some aspects, the systems and techniques can utilize static data locations for input data that is persisted for multiple cycles of the convolution operation. The static data locations can be associated with local storage (e.g., RAM, cache, other memory, etc.) of a compute unit (CU) that is used to implement the convolution operations. For instance, a particular pixel of an input image can be used to calculate multiple different output location values of the convolution (e.g., a particular pixel can be included in multiple different sliding window positions of the convolution kernel). In some aspects, the systems and techniques can store pixel data using static locations (e.g., in RAM, cache, other memory, etc.), where the static pixel data is used to determine multiple different output location values of the convolution. For each clock cycle (e.g., each "step" of the sliding convolution kernel), a portion of the static pixel data can be replaced. For example, the portion of the static pixel data that is no longer utilized by any of the MAC operations for the current position of the sliding convolution kernel can be replaced with updated values corresponding to pixels that are newly covered by the current position of the sliding convolution kernel.

Figure 3:
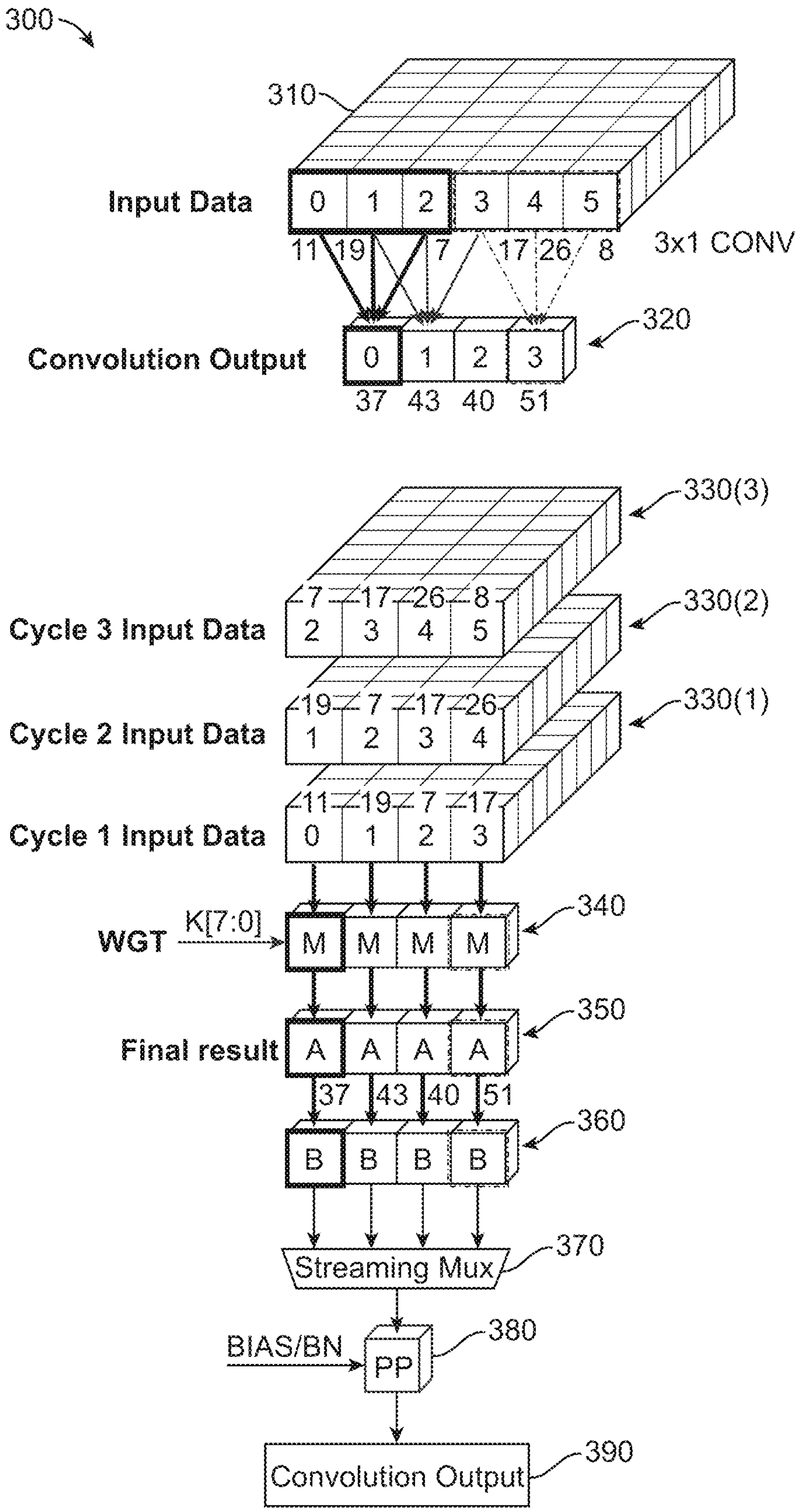
FIG. 3 illustrates an example of a 3×1 convolution, in accordance with some examples.

FIG. 3 is a diagram illustrating an example of a 3×1 two-dimensional (2D) convolution 300, using static multiplication units and static accumulator locations to implement MAC operations based on receiving new activation data at each cycle (e.g., each clock cycle). For instance, the example convolution 300 is associated with a 2D input data 310 that includes a plurality of pixels. In some examples, the 2D input data 310 can be an image or frame of video, etc.

Sliding a 3×1 convolution kernel (or filter) across each row of the input data 310 (e.g., from left-to-right, or right-to-left) generates a corresponding row of the convolution output 320. Each output location of the convolution output 320 is associated with a different sliding window position of the 3×1 convolution kernel over a row of the input data 310.

For instance, to generate four output locations within the convolution output 320, a total of six input locations within the input data 310 are utilized. The location '0' of the convolution output 320 is based on the 3×1 convolution kernel position over locations '0,' '1,' '2' of the input data 310; the location '1' of the convolution output 320 is based on the 3×1 convolution kernel position over locations '1,' '2,' '3' of the input data 310; the location '2' of the convolution output 320 is based on the 3×1 convolution kernel position over locations '2,' '3,' '4' of the input data 310; and the location '3' of the convolution output 320 is based on the 3×1 convolution kernel position over locations '3,' '4,' '5' of the input data 310.

In some examples, a CNN or other machine learning network can implement convolutional operations based on computing multiple output locations concurrently. For instance, the four output locations of the convolution output 320 can be computed concurrently, using a corresponding four compute units (CUs) to perform the MAC operations for each output location of the convolution output 320.

A CU used to perform MAC operations for a particular convolution output location can include a multiplier (M) 340, an accumulator (A) 350, and/or a buffer (B) 360. In these examples, the four multipliers 340, four accumulators 350, and four buffers 360 can be used to calculate the four output locations of the convolution output 320 concurrently, using a total of three cycles.

Each cycle is associated with a corresponding input data. For example, a first cycle ("Cycle 1") is associated with a Cycle 1 input data 330(1), a second cycle ("Cycle 2") is associated with a Cycle 2 input data 330(2), and a third cycle ("Cycle 3") is associated with a Cycle 3 input data 330(3). The cycle input data 330(1)-(3) can be obtained as a subset of the input data 310. For example, in Cycle 1, the input data 0/1/2/3 are sent to the four multipliers 340, respectively. In Cycle 2, the input data 1/2/3/4 are sent to the four multipliers 340. In Cycle 3, the input data 2/3/4/5 are sent to the four multipliers 340.

The multipliers 340 can be included in a multiplier and adder tree associated with implementing MAC operations for the convolution. In some examples, the multipliers 340 can receive or utilize one or more weight values (e.g., depicted in FIG. 3 as "WGT K[7:0]). The output of each multiplier (e.g., of the multipliers 340) can be provided to a corresponding accumulator (e.g., of the accumulators 350). The output of each accumulator 350 can be provided to a corresponding accumulator buffer 360.

After performing Cycle 1, Cycle 2, and Cycle 3, the contents of the accumulator buffers 360 (e.g., accumulated data for each MAC) can be provided to a streaming mux 370. In some cases, the output of streaming mux 370 can be provided to a post-processing engine 380, which can perform one or more post-processing operations (e.g., "BIAS/BN" of FIG. 3, etc.) to generate the convolution output 390. In some aspects, the convolution output 390 can be the same as the convolution output 320.

In some convolution techniques, the input data is fully cleared and refreshed between each cycle (e.g., a first memory location stores the input data '0' for the first cycle 330(1), then stores the input data '1' for the second cycle 330(2), and then stores the input data '2' for the third cycle 330(3)). The same input data value may also be read and transferred to memory multiple times over a plurality of cycles corresponding to generating the convolution output 390. The same input data value is stored in different memory locations across the plurality of cycles 330(1)-(3). For instance, the input data '1' is stored in two different memory locations in the cycle 1 input data 330(1) and the cycle 2 input data 330(2). The input data '2' and '3' are each stored in a respective three different memory locations in the cycle 1 input data 330(1), the cycle 2 input data 330(2), and the cycle 3 input data 330(3).

Refreshing the input data for each cycle can be associated with performing multiple data toggling operations in the data path for the example 3×1 convolution 300. Increased data toggling can be associated with increased power consumption. Thus in some instances, it may be beneficial to reduce data toggling and to reduce power consumption associated with performing convolution operations.

Figure 4:
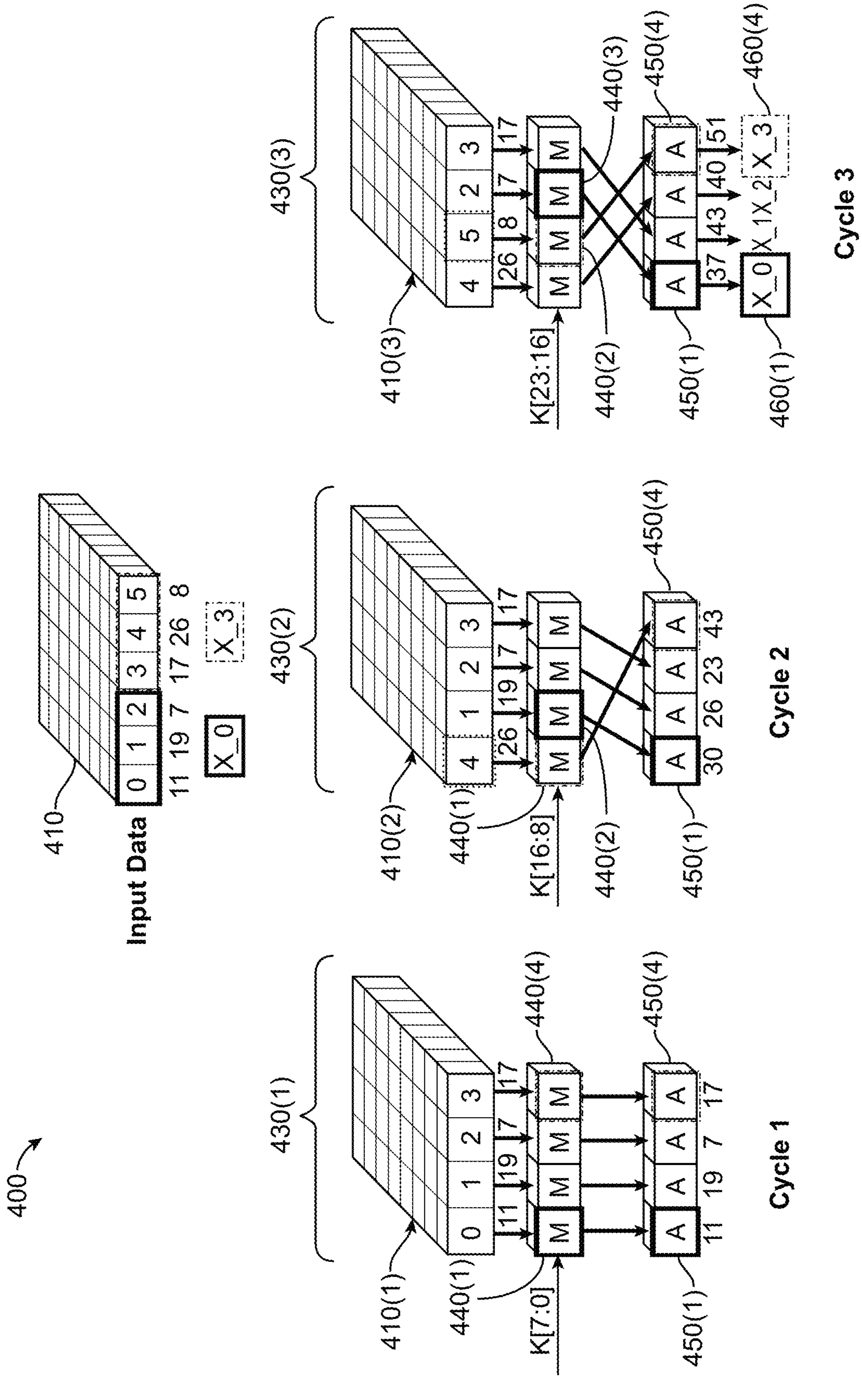
FIG. 4 illustrates an example of a 3×1 convolution using static data locations and static output accumulator locations, in accordance with some examples.

FIG. 4 is a diagram illustrating an example of a 3×1 convolution 400 using one or more static input data locations and static output accumulator locations, in accordance with some examples. For instance, the 3×1 convolution 400 can be performed based on a first cycle ("Cycle 1") 430(1), a second cycle ("Cycle 2") 430(2), and a third cycle ("Cycle 3") 430(3). Each of the three cycles 430(1), 430(2), and 430(3) can be associated with a corresponding cycle input data 410(1), 410(2), and 410(3), respectively. Each cycle input data 410(1)-410(3) can be a subset of the input data 410. In some aspects, the input data 410 can be the same as or similar to the input data 310 of FIG. 3.

In some aspects, the convolution 400 can be performed using one or more static input data locations per cycle. For instance, the respective memory locations associated with local storage (e.g., local to a CU including a multiplier (M) and accumulator (A) for implementing a MAC operation) of the input data '1,' '2,' and '3' may be unchanged (e.g., static) between Cycle 1 and Cycle 2. The respective memory locations associated with local storage of the input data '2' and '3' may be unchanged (e.g., static) between Cycle 1, Cycle 2, and Cycle 3.

For instance, between Cycle 1 and Cycle 2, the stored values for input data '1,' '2,' and '3' are not updated, based on the input data '1,' '2,' and '3' being utilized for both the Cycle 1 MAC operations and the Cycle 2 MAC operations. The input data '0' is utilized for the Cycle 1 MAC operations but is not needed for the Cycle 2 MAC operations. In some examples, only the memory locations associated with local storage of input data that is not needed for the current cycle MAC operations are refreshed and updated with new input data values (e.g., corresponding to input data that is newly needed for the current cycle MAC operations and was not needed for the previous cycle MAC operations).

For instance, the Cycle 1 input data 410(1) includes the input data '0,' which is needed for the Cycle 1 MAC operations and not needed for the Cycle 2 MAC operations. The input data '4' is needed for the Cycle 2 MAC operations and not needed for the Cycle 1 MAC operations. In some cases, the Cycle 2 input data 410(2) does not include the input data '0' and includes the input data '4.'

In some aspects, each respective cycle input data 410(1)-(3) can be generated based on replacing input data values that are outside the current convolution kernel position (e.g., the position of the convolution kernel for the current cycle) with input data values that are within the current convolution kernel position. In some cases, the replaced input data values are located at the trailing edge of the sliding convolution kernel (e.g., the left edge of the convolution kernel, for left-to-right sliding) and the updated or replacement input data values are located at the leading edge of the sliding convolution kernel (e.g., the right edge of the convolution kernel, for right-to-left sliding).

In some examples, the replaced input data values (e.g., at the trailing edge of the convolution kernel position) and the replacement input data values (e.g., at the leading edge of the convolution kernel position) for each cycle can be stored using the same memory locations. For instance, the replacement input data values '4' can overwrite the replaced input data values '0' in the same memory locations to generate the Cycle 2 input data 410(2) from the Cycle 1 input data 410(1). In another example, the replacement input data values '5' can overwrite the replaced input data values '1' in the same memory locations to generate the Cycle 3 input data 410(3) from the Cycle 2 input data 410(3).

For the example 3×1 convolution 400 of FIG. 4, instead of sending new data to each CU for each cycle (e.g., as described with respect to the example convolution 300 of FIG. 3), the systems and techniques can preserve 75% of the previous cycle input data using static memory locations and can update the memory locations corresponding to the remaining 25% of the previous cycle input data with replacement input data values for the current cycle.

In some cases, each cycle input data 410(1)-410(3) includes four columns and eight rows, for a total of 32 input data values per cycle. In some aspects, the eight rows can represent different channels of the input data 410. Additional CUs (e.g., multipliers 440(1)-(4), accumulators 450(1)-(4), etc.) may be provided to process the 32 input data values per cycle concurrently. In some examples, the four multipliers 440(1)-(4) and the four accumulators 450(1)-(4) may be used to process the four input values of a single row (e.g., corresponding to the four different columns) concurrently, with the eight row inputs of four values each being processed sequentially using the same four multipliers 440(1)-(4) and accumulators 450(1)-(4).

In some aspects, at least a portion of the cycle input data memory locations are kept constant (e.g., remain static or persistent) for at least two cycles of the example convolution 400. In some examples, the systems and techniques can utilize shifting (e.g., moving) MACs (e.g., CUs, multipliers 440(1)-(4), accumulators 450(1)-(4), etc.) to generate the four convolution outputs X_0, X_1, X_2, and X_3 of FIG.

4 (e.g., shown in Cycle 3 as the output of the accumulators 450(1)-(4) after the three cycles are completed).

For instance, in Cycle 1, the multiplier 440(1) receives the input data '0' of the Cycle 1 input data 410(1). The output of the multiplier 440(1) is stored in the accumulator 450(1). In Cycle 2, the mapping between multipliers and accumulators is shifted one column to the right. The multiplier 440(2) receives the input data '1' of the Cycle 2 input data 410(2), and the output of the multiplier 440(2) is stored in the same accumulator 450(1). In Cycle 3, the mapping between multipliers and accumulators is again shifted one column to the right. The multiplier 440(3) receives the input data '2' of the Cycle 3 input data 410(3), and the output of the multiplier 440(3) is stored in the same accumulator 450(1).

At the end of the three cycles of the convolution 400, the output of the accumulator 450(1) (e.g., the output of a corresponding accumulator buffer for the accumulator 450 (1)) is X_0, shown in FIG. 4 as the first convolution output location 460(1). Based on shifting the mapping between the multipliers 440(1)-(4) and the accumulators 450(1)-(4) to correspond to the respective static input data memory locations and the updated input data memory locations used in each cycle input data 410(1)-(3), the respective convolution outputs X_0, X_1, X_2, X_3 of FIG. 4 are the same as the convolution outputs 320/390 determined using the example convolution 300 of FIG. 3 (e.g., the convolution output determined using new input data for each cycle and without shifting multipliers or CUs).

The convolution output X_3 460(4) can be generated using the same shifting of the mapping between multipliers 440(1)-(4) and accumulators 450(1)-(4) over the three cycles, where convolution output X_3 460(4) is based on MAC operations using input data '3,' '4,' and '5.' For instance, in Cycle 1, the multiplier 440(4) receives the input data '3' of the Cycle 1 input data 410(1). The output of the multiplier 440(1) is stored in the accumulator 450(4). In Cycle 2, the mapping between multipliers and accumulators is shifted one column to the right (e.g., as described above). The convolution output X_3 460(4) utilizes the replacement input data '4' that is used to generate the Cycle 2 input data 410(2) by updating the memory locations corresponding to the replaced input data '0' in the Cycle 1 input data 410(1). In Cycle 2, the replacement input data '4' can be provided to the multiplier 440(1), and the output of the multiplier 440(1) can be stored in the same accumulator 450(4), based on the shifted mapping between multipliers and accumulators used for Cycle 2. At the end of Cycle 2, the accumulator buffer associated with the accumulator 450(4) contains the result of MAC operations based on input data '3' and input data '4.'

In Cycle 3, the mapping between multipliers and accumulators is again shifted one column to the right (e.g., as described above). The convolution output X_3 460(4) utilizes the replacement input data '5' that is used to generate the Cycle 3 input data 410(3) by updated the memory locations corresponding to the replaced input data '1' in the Cycle 2 input data 410(2). In Cycle 3, the replacement input data '3' can be provided to the multiplier 440(2), and the output of the multiplier 440(2) can be stored in the same accumulator 450(4), based on the shifted mapping between multipliers and accumulators used for Cycle 3. At the end of Cycle 3, the accumulator buffer associated with the accumulator 450(4) contains the result of MAX operations based on input data '3,' '4,' and '5' (e.g., the fourth convolution output location value X_3 460(4)).

Figure 5:
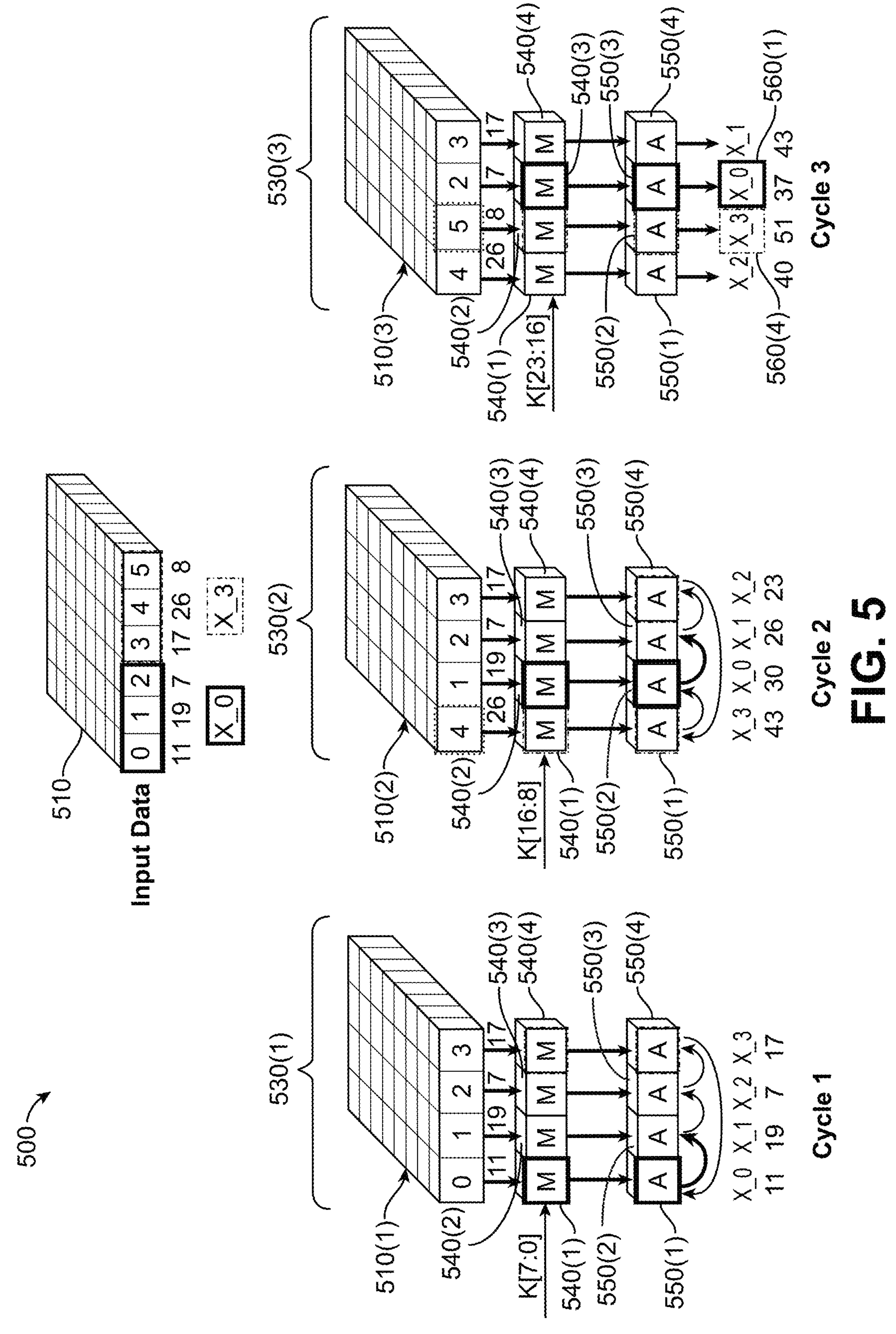
FIG. 5 illustrates an example of a 3×1 convolution using shifted output accumulator locations, in accordance with some examples.

FIG. 5 is a diagram illustrating an example of a 3×1 convolution 500 using one or more static input data locations with shifted CUs (e.g., shifted MAC computation units each including a respective multiplier and a respective accumulator), in accordance with some examples. For instance, the 3×1 convolution 500 can be performed based on a first cycle ("Cycle 1") 530(1), a second cycle ("Cycle 2") 530(2), and a third cycle ("Cycle 3") 530(3). Each of the three cycles 530(1), 530(2), and 530(3) can be associated with a corresponding cycle input data 510(1), 510(2), and 510(3), respectively. Each cycle input data 510(1)-510(3) can be a subset of the input data 510. In some aspects, the input data 510 can be the same as or similar to the input data 310 of FIG. 3 and/or the input data 410 of FIG. 4.

In some aspects, the example convolution 400 of FIG. 4 can be implemented based on shifting MAC CU locations per cycle and output accumulator locations that are static, using corresponding data switching to maintain a mapping between MAC outputs and accumulator inputs (e.g., such that each accumulator output corresponds to one of the four convolution outputs X_0, X_1, X_2, or X_3). In some aspects, the example convolution 500 of FIG. 5 can be implemented based on shifting MAC CU locations and output accumulator locations together. Based on the shifting the MAC CU locations and the output accumulator locations for each cycle of the convolution 500, the systems and techniques can reduce data toggling between the MAC output and the accumulator input. For instance, using the shifted MAC CU and accumulator of FIG. 5, each respective accumulator 550(1)-550(4) receives data from a total of two locations. As will be described in greater depth below, the number of accumulator data inputs may be two, independent of the number size of the convolution kernel (e.g., for n×m convolutions in addition to the example 3×1 convolution 500). Using the shifted MAC CU and static accumulator of FIG. 4, each respective accumulator 450(1)-450(4) receives data from a total of three locations per row (e.g., for an n×1 convolution, each respective accumulator 450(1)-450(4) receives data from n locations for each row in the cycle input data).

In some cases, the cycle input data 510(1), 510(2), and 510(3) of FIG. 5 can be the same as the cycle input data 410(1), 410(2), and 410(3), respectively, of FIG. 4. In Cycle 1 (e.g., 530(1) of FIG. 5), the input data '0' is provided to a first multiplier 540(1), the input data '1' is provided to a second multiplier 540(2), the input data '2' is provided to a third multiplier 540(3), and the input data '3' is provided to a fourth multiplier 540(4). The multipliers 540(1)-(4) can each correspond to a respective accumulator 550(1)-550(4). For example, the output of first multiplier 540(1) can be provided to a first accumulator 550(1), etc.

At the end of each cycle, the accumulated value within each accumulator 550(1)-(4) can be shifted to a different accumulator, corresponding to the multiplier that will receive the next input data value used to calculate a particular convolution output value. For instance, in Cycle 1, the first multiplier 540(1) and first accumulator 550(1) correspond to the first convolution output value X_0.

In Cycle 2, the second multiplier 540(2) and second accumulator 550(2) will correspond to the first convolution output value X_0. In some examples, at the end of Cycle 1 (e.g., prior to Cycle 2), the contents of accumulator 550(1) can be shifted to accumulator 550(2). At the beginning of Cycle 2, the accumulator 550(2) stores a MAC value based on input data '0.' In Cycle 2, the input data '1' is provided to multiplier 540(2), and the output of multiplier 540(2) is stored in accumulator 550(2). After performing Cycle 2, the accumulator 550(2) stores a MAC value based on input data '0' and '1.'

In Cycle 3, the third multiplier 540(3) and third accumulator 550(3) will correspond to the first convolution output value X_0. In some aspects, at the end of Cycle 2 (e.g., prior to Cycle 3), the contents of accumulator 550(2) can be shifted to accumulator 550(3). In Cycle 3, the input data '2' is provided to multiplier 540(3), and the output of multiplier 540(3) is stored in accumulator 550(3). After performing Cycle 3, the accumulator 550(3) stores a MAC value based on the input data '0,' '1,' and '2' (e.g., equal to the first convolution output X_0 560(1).

In some aspects, the accumulators 550(1)-(4) can implement the same shift at the end of each cycle of the example convolution 500. For instance, after Cycles 1 and 2, the accumulated value stored in first accumulator 550(1) can be shifted to and stored in second accumulator 550(2). The accumulated value previously stored in second accumulator 550(2) can be shifted to and stored in third accumulator 550(3). The accumulated value previously stored in third accumulator 550(3) can be shifted to and stored in fourth accumulator 550(4). The accumulated value previously stored in fourth accumulator 550(4) can be shifted to and stored in first accumulator 550(1).

In some examples, each accumulator 550(1)-(4) can be used to implement the convolution 500 based on receiving two respective inputs per cycle (e.g., per Cycles 1-3). For instance, in each cycle, each accumulator 550(1)-(4) can receive a first input corresponding to the respective output of the multipliers 540(1)-(4). The second input to each accumulator 550(1)-(4) is the accumulated value stored in the adjacent accumulator. For example, in each cycle, the first accumulator 550(1) receives a first input corresponding to the output of first multiplier 540(1) and receives a second input corresponding to the accumulated value stored in fourth accumulator 550(4) at the end of the cycle. In each cycle, the second accumulator 550(2) receives a first input corresponding to the output of second multiplier 540(2) and receives a second input corresponding to the accumulated value stored in first accumulator 550(1) at the end of the cycle, etc. Based on implementing the shifted MAC CU and accumulator pairs described above, example convolution 500 can be associated with a 2:1 mux.

Figure 6:
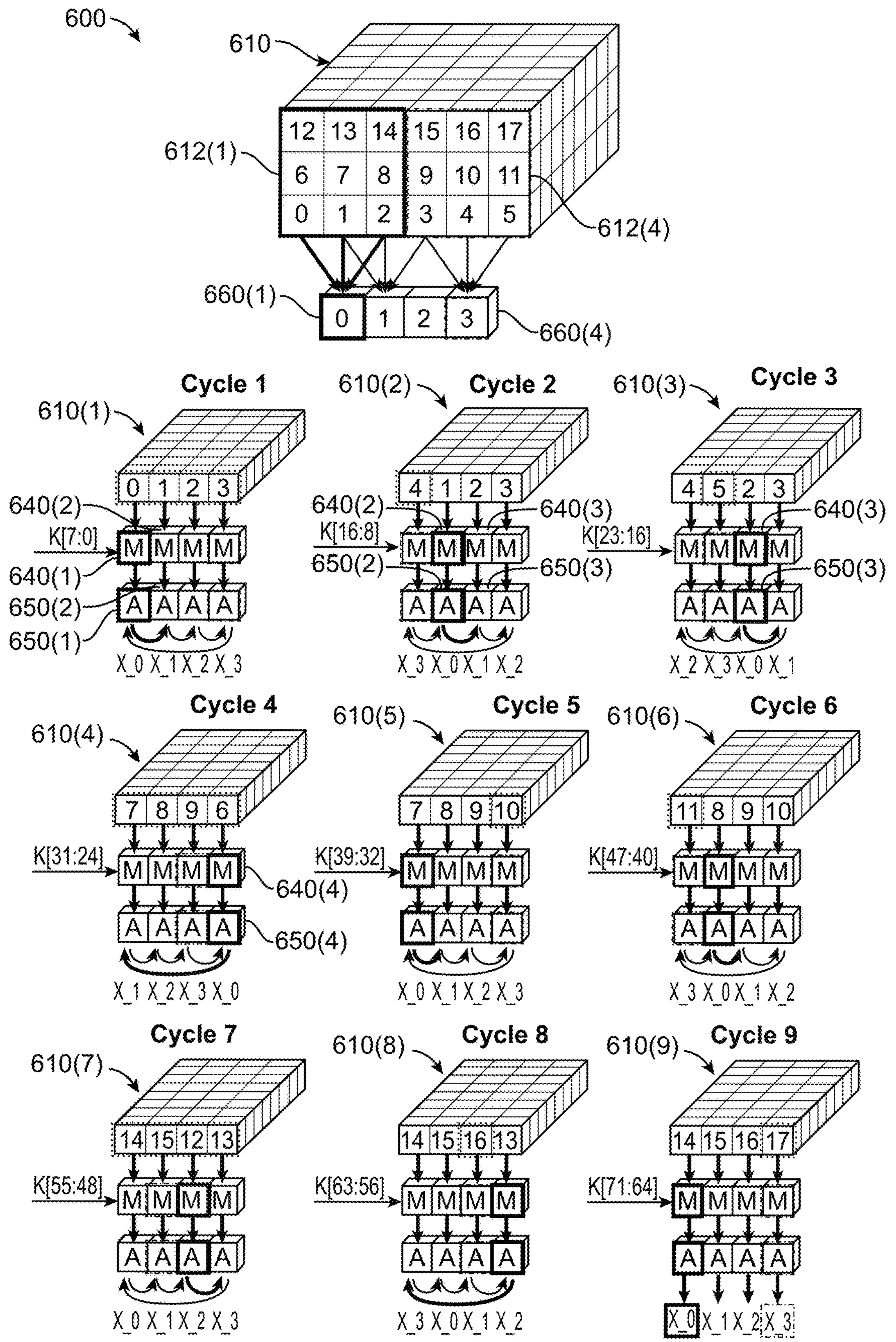
FIG. 6 illustrates an example of a 3×3 convolution using shifted output accumulator locations, in accordance with some examples.

FIG. 6 is a diagram illustrating an example of a 3×3 convolution 600 using shifted MAC CU and output accumulator locations, in accordance with some examples. The 3×3 convolution 600 can be performed using an input data 610, which may be an image comprising a plurality of pixels each associated with a plurality of channels. For instance, input data 610 includes six columns and three rows (e.g., 18 values) for each channel of a plurality of channels. For the eight channels shown in FIG. 6, the input data 610 includes a total of 6*3*8=144 values.

The 3×3 convolution 600 can be implemented using a 3×3 convolution kernel, which performs MAC operations to calculate an element-wise multiplication and summation for a 3×3 subset of the input data 610 with the weight matrix of the 3×3 convolution kernel. For example, a first convolution output 660(1) can be determined using the 3×3 convolution kernel in position 612(1). Position 612(1) of the 3×3 convolution kernel corresponds to the input data 0/1/2/6/7/8/12/13/14. The first convolution output 660(1) can be determined based on the MAC of the input data 0/1/2/6/7/8/12/13/14 with the 3×3 weight matrix of the convolution kernel.

A fourth convolution output 660(4) can be determined using the 3×3 convolution kernel in position 612(4). Position 612(4) of the 3×3 convolution kernel corresponds to the input data 3/4/5/9/10/11/15/16/17. The fourth convolution output 660(4) can be determined based on the MAC of the input data 3/4/5/9/10/11/15/16/17 with the 3×3 weight matrix of the convolution kernel.

In some examples, the systems and techniques described herein can implement the example 3×3 convolution 600 using a plurality of cycles, where each cycle corresponds to a cycle input data that is a subset of the input data 610. For instance, a first cycle ("Cycle 1") can correspond to a first cycle input data 610(1), a second cycle ("Cycle 2") can correspond to a second cycle input data 610(2), . . . , and a ninth cycle ("Cycle 9") can correspond to a ninth cycle input data 610(9).

In some aspects, the cycle input data 610(1), 610(2), and 610(3) can be the same as the respective cycle input data 510(1), 510(2), and 510(3) of FIG. 5. The cycle input data associated with the same row within the input data 610 can use static memory locations to reuse input data values across multiple cycles, as described previously with respect to FIGS. 4 and 5. For instance, the memory locations used to store input data '1' can be the same for the Cycle 1 data 610(1) and the Cycle 2 data 610(2), and the memory locations used to store input data '2' and '3' can be the same for the Cycle 1 data 610(1), the Cycle 2 data 610(2), and the Cycle 3 data 610(3), etc.

In some aspects, each convolution row of the input data 610 is associated with three cycles of MAC operations. For instance, a first 6×1 row of input data 610 is used to perform four respective MAC operations (e.g., corresponding to the respective four convolution outputs 660(1)-660(4)) using the input data 0/1/2/3/4/5. A second 6×1 row is used to perform four respective MAC operations using the input data 6/7/8/9/10/11. A third 6×1 row is used to perform four respective MAC operations using the input data 12/13/14/15/16/17.

One or more memory locations used to store input data corresponding to a particular row can be the same for one or more cycles performed for the particular row. In some aspects, when a new row starts, all memory locations used to store input data of the previous row can be updated to store input data of the current row. For example, Cycles 1-3 correspond to the first row of input data 0/1/2/3/4/5 used to calculate the four convolution outputs 660(1)-(4). Cycles 4-6 correspond to the second row of input data 6/7/8/9/10/11 used to calculate the four convolution outputs 660(1)-(4). Cycles 7-9 correspond to the third row of input data 12/13/14/15/16/17 used to calculate the four convolution outputs 660(1)-(4).

After Cycle 3, each memory location used to store the Cycle 3 input data 610(3) can be updated (e.g., replaced with) to store the Cycle 4 input data 610(4). After Cycle 6, each memory location used to store the Cycle 6 input data 610(6) can be updated (e.g., replaced with) to store the Cycle 7 input data 610(7).

Between cycles associated with the same row of input data 610 (e.g., Cycles 1-2 and 2-3; Cycles 4-5 and 5-6; Cycles 7-8 and 8-9), only one set of memory locations are updated to store replacement input data values. For instance, between Cycles 1 and 2, the input data '0' is replaced with the input data '4,' and between Cycles 2 and 3, the input data '1' is replaced with the input data '5.' Between Cycles 4 and 5, the input data '6' is replaced with the input data '10,' and between Cycles 5 and 6, the input data '7' is replaced with the input data '11.' Between Cycles 7 and 8, the input data '12' is replaced with the input data '16,' and between Cycles 8 and 9, the input data '13' is replaced with the input data '17.'

In some cases, the 3×3 convolution 600 can be implemented using the shifted MAC CU and accumulator locations as described above with respect to the example 3×1 convolution 500 of FIG. 5. For instance, in Cycle 1, the accumulated value corresponding to convolution output X_0 660(1) can be stored in a first accumulator 650(1), . . . , and the accumulated value corresponding to convolution output X_3 660(4) can be stored in a fourth accumulator 650(4).

Before or during Cycle 2, the accumulated value stored in first accumulator 650(1) can be transferred to second accumulator 650(2), . . . , and the accumulated value stored in fourth accumulator 650(4) can be transferred to first accumulator 650(1). After Cycle 2, the accumulated value stored in second accumulator 650(2) corresponds to the first convolution output X_0 660(1) and the accumulated value stored in first accumulator 650(1) corresponds to the fourth convolution output X_3 660(4). After Cycle 3, the accumulated value stored in third accumulator 650(3) corresponds to the first convolution output X_0 660(1) and the accumulated value stored in second accumulator 650(2) corresponds to the fourth convolution output X_3 660(4).

After Cycle 4, the accumulated value stored in fourth accumulator 650(4) corresponds to the first convolution output X_0 660(1) and the accumulated value stored in third accumulator 650(3) corresponds to the fourth convolution output X_3 660(4). After Cycle 5, the accumulated value stored in first accumulator 650(1) corresponds to the first convolution output X_0 660(1) and the accumulated value stored in fourth accumulator 650(4) corresponds to the fourth convolution output X_3 660(4).

After Cycle 9, the accumulated value stored in first accumulator 650(1) corresponds to the full convolution output X_0 660(1) and is based on MAC operations using the input data 0/1/2/6/7/8/12/13/14 that are within the 3×3 convolution kernel in the first position 612(1). After Cycle 9, the accumulated value stored in fourth accumulator 650 (1) corresponds to the full convolution output X_3 660(4) and is based on MAC operations using the input data 3/4/5/9/10/11/15/16/17 that are within the 3×3 convolution kernel in the fourth position 612(4).

Figure 7:
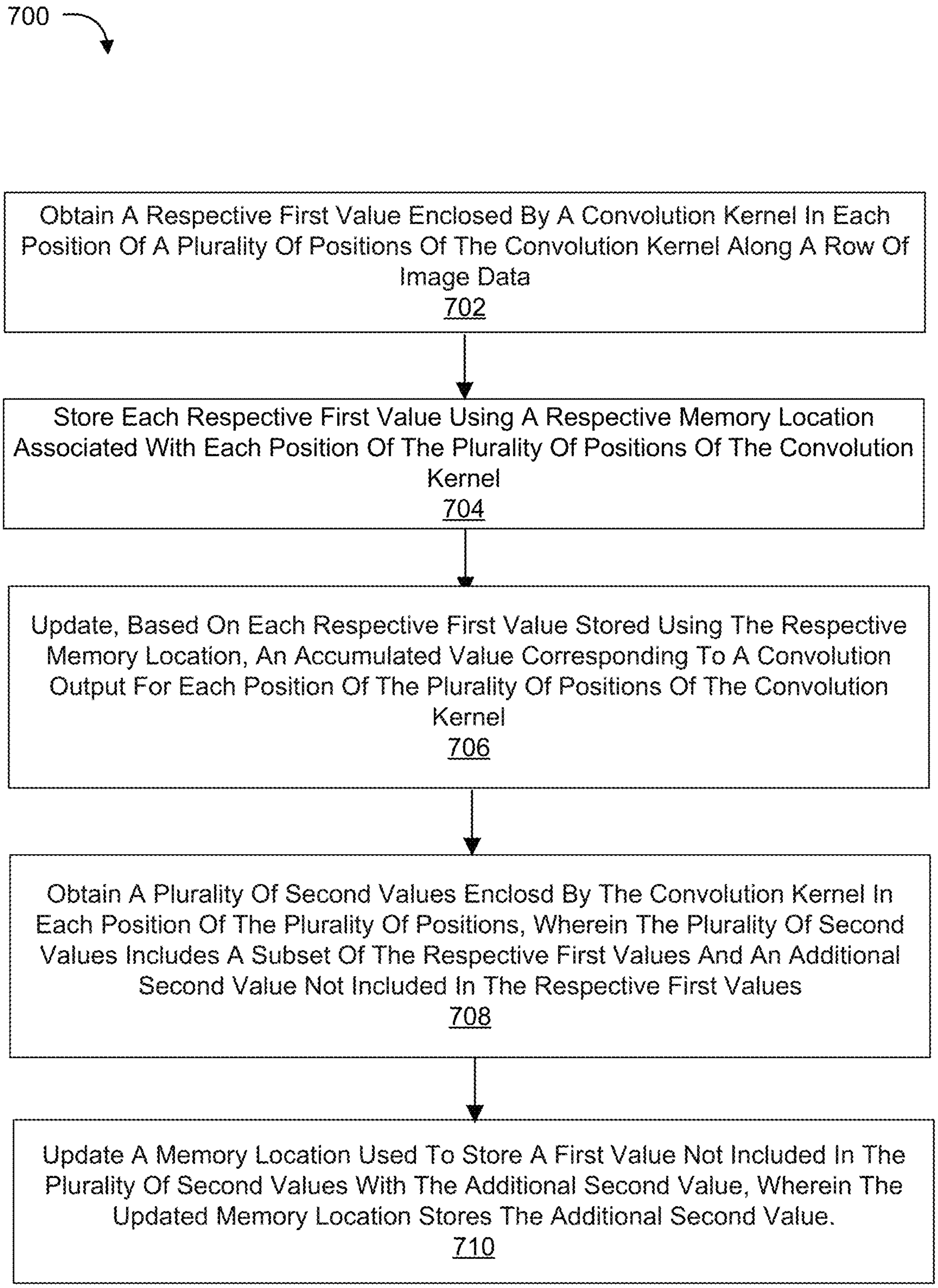
FIG. 7 is a flow diagram illustrating an example of a process for processing image and/or video data, in accordance with some examples.

FIG. 7 is a flowchart illustrating an example of a process 700 for processing image data. Although the example process 700 depicts a particular sequence of operations, the sequence may be altered without departing from the scope of the present disclosure. For example, some of the operations depicted may be performed in parallel or in a different sequence that does not materially affect the function of the process 700. In other examples, different components of an example device or system that implements the process 700 may perform functions at substantially the same time or in a specific sequence.

At block 702, the process 700 includes obtaining a respective first value enclosed by a convolution kernel in each position of a plurality of positions of the convolution kernel along a row of the image data. For instance, the row of the image data can be the same as or similar to the row of the input data 310 of FIG. 3. The respective first value enclosed by the example 3×1 convolution kernel of FIG. 3 in a first position can be the input data '0', the respective first value enclosed by the example 3×1 convolution kernel of FIG. 3 in a second position can be the input data '1', etc. In some cases, the plurality of positions of the convolution kernel along the row of the image data can correspond to sliding the convolution kernel across the row of the image data. For instance, the cycle 430(1) of FIG. 4 can correspond to a first position of the convolution kernel along the row of the image data 410, the cycle 430(2) can correspond to a second position of the convolution kernel, and the cycle 430(3) can correspond to a third position of the convolution kernel. In FIG. 5, the cycle 530(1) can correspond to a first position of the convolution kernel along the row of the image data 510, the cycle 530(2) can correspond to a second position of the convolution kernel, and the cycle 530(3) can correspond to a third position of the convolution kernel. The cycles 1-9 of FIG. 6 can correspond to nine different positions of the convolution kernel along three rows of the input image data 610 and/or 612(1) of FIG. 6.

In some examples, the process 700 includes determining the convolution output for each position of the plurality of positions of the convolution kernel based on a plurality of convolution cycles, each convolution cycle of the plurality of convolution cycles corresponding to a different location within the convolution kernel. For instance, the convolution output 320 of FIG. 3 can be determined for each position of the plurality of positions of the convolution kernel based on the plurality of convolution cycles 330(1)-330(3). The convolution outputs 460(1)-460(4) of FIG. 4 can be determined for each position of the plurality of positions of the convolution kernel along the image data 410 based on the plurality of convolution cycles 430(1)-430(3). The convolution outputs 560(1)-560(4) of FIG. 5 can be determined for each position of the plurality of positions of the convolution kernel along the image data 510 based on the plurality of convolution cycles 530(1)-530(3).

In some examples, a first convolution cycle corresponds to the respective first value enclosed by the convolution kernel, each respective first value corresponding to a first location within the convolution kernel. For instance, the respective first value can correspond to a first location comprising the left-most location within the convolution kernel positioned over the row of image data. In some cases, the convolution output for each position of the plurality of positions of the convolution kernel along the row of the image data is associated with a different multiplier compute unit (CU) for each convolution cycle of the plurality of convolution cycles. For instance, the multiplier CU can be the same as or similar to one or more of the multipliers 340, accumulators 350, and/or buffers 360 of FIG. 3 (e.g., collectively, a MAC CU). The multiplier CU can be the same as or similar to one or more of the multiplier CUs 440(1)-440(4) of FIG. 4, one or more of the multiplier CUs 540(1)-540(4) of FIG. 5, and/or one or more of the multiplier CUs 640(1)-640(4) of FIG. 6.

At block 704, the process 700 includes storing each respective first value using a respective memory location associated with each position of the plurality of positions of the convolution kernel. For instance, each respective first value can be stored using one of the accumulators 350 and/or one of the buffers 360 of FIG. 6, one of the accumulators 450(1)-450(4) of FIG. 4, one of the accumulators 550(1)-550(4) of FIG. 5, and/or one of the accumulators 650(1)-650(4) of FIG. 6.

At block 706, the process 700 includes updating, based on each respective first value stored using the respective memory location, an accumulated value corresponding to a convolution output for each position of the plurality of positions of the convolution kernel. In some cases, the accumulated value is updated based on performing, using a compute unit (CU) for each respective memory location, a respective multiplier-accumulator (MAC) operation using the respective first value stored using the respective memory location, and providing an output of each respective MAC operation to an accumulator buffer associated with the CU for each respective memory location. For instance, each accumulated value stored in the respective accumulators 450(1)-450(4) of FIG. 4 can be updated in each of the convolution cycles 430(1)-430(3) using an output of one of the multipliers 440(1)-440(4) based on each respective first value. In another example, each accumulated value stored in the respective accumulators 550(1)-550(4) of FIG. 5 can be updated in each of the convolution cycles 530(1)-530(3) using an output of one of the multipliers 540(1)-540(4) based on each respective first value.

At block 708, the process 700 includes obtaining a plurality of second values enclosed by the convolution kernel in each position of the plurality of positions, wherein the plurality of second values includes a subset of the respective first values and an additional second value not included in the respective first values. For instance, in FIG. 4, the plurality of positions of the 3×1 convolution kernel along the row of input data 410 comprising the inputs [0 1 2 3 4 5] can include a first position enclosing [0 1 2], a second position enclosing [1 2 3], a third position enclosing [2 3 4], and a fourth position enclosing [3 4 5].

The plurality of first values can be obtained for the four positions of the 3×1 convolution kernel of FIG. 4 in the first convolution cycle 430(1). The first first value is 0, the second first value is 1, the third first value is 2, and the fourth first value is 3.

The plurality of second values can be obtained for the four positions of the 3×1 convolution kernel of FIG. 4 in the second convolution cycle 430(2). The first second value is 1, the second second value is 2, the third second value is 3, and the fourth second value is 4.

The plurality of second values (e.g., 1, 2, 3, 4) includes the subset (1, 2, 3) of the first values (e.g., 0, 1, 2, 3) and includes the additional second value (e.g., 4) that is not included in the plurality of first values.

In some cases, the convolution output can be determined for each position of the plurality of positions of the convolution kernel based on a plurality of convolution cycles, each convolution cycle of the plurality of convolution cycles corresponding to a different location within the convolution kernel. For example, a first convolution cycle corresponds to the respective first value enclosed by the convolution kernel in each position, wherein each respective first value corresponding to a first location within the convolution kernel. The first convolution cycle can be the same as or similar to the first convolution cycle 430(1) of FIG. 4, which corresponds to the respective first values 0, 1, 2, 3 enclosed by the 3×1 convolution kernel of FIG. 4 in each of four positions. Each of the respective first values 0, 1, 2, 3 can correspond to the left-most location within the convolution kernel in each of the four positions.

A second convolution cycle corresponds to the plurality of second values enclosed by the convolution kernel in each position, each respective second value of the plurality of second values corresponding to a second location within the convolution kernel, and wherein the second location is adjacent to the first location. For instance, the second convolution cycle can be the same as or similar to the second convolution cycle 430(2) of FIG. 4, which corresponds to the respective second values 1, 2, 3, 4 enclosed by the 3×1 convolution kernel of FIG. 4 in each of the four positions. Each of the respective second values 1, 2, 3, 4 can correspond to the middle location of the 3×1 convolution kernel of FIG. 4 (e.g., adjacent to the first location, which is the left-most location of the example 3×1 convolution kernel of FIG. 4).

In some examples, the convolution output for each position of the plurality of positions of the convolution kernel along the row of the image data is associated with a different multiplier compute unit (CU) for each convolution cycle of the plurality of convolution cycles. In some cases, the convolution output for a first position of the plurality of positions is associated with a first multiplier CU for a first convolution cycle of the plurality of convolution cycles, wherein the first multiplier CU is associated with a first memory location used to store the respective first value for the first position of the convolution kernel and a second multiplier CU for a second convolution cycle of the plurality of convolution cycles, wherein the second multiplier CU is associated with a second memory location used to store a respective second value included in the subset of first values.

For instance, the first position of the example 3×1 convolution kernel of FIG. 4 is associated with the multiplier CU 440(1) in cycle 430(1), is associated with the multiplier CU 440(2) in cycle 430(2) and is associated with the multiplier CU 440(3) in cycle 430(3). The second position of the example 3×1 convolution kernel of FIG. 4 is associated with the multiplier CU 440(2) in cycle 430(1), is associated with the multiplier CU 440(3) in cycle 430(2) and is associated with the multiplier CU 440(4) in cycle 430(3).

In some examples, an output of the first multiplier CU is stored in a first accumulator buffer for each convolution cycle of the plurality of convolution cycles, and an output of the second multiplier CU is stored in a second accumulator buffer for each convolution cycle of the plurality of convolution cycles. For instance, the output of multiplier CUs 540(1)-540(4) of FIG. 5 are stored in the respective accumulator buffers 550(1) 550(4) for each of the convolution cycles 530(1)-530(3). For instance, the output of first multiplier CU 540(1) is stored in first accumulator buffer 550(1) for each of the convolution cycles 530(1)-530(3), etc.

In some cases, an accumulated value stored in the first accumulator buffer at an end of each convolution cycle replaces an accumulated value stored in the second accumulator buffer at the end of each convolution cycle. For instance, the accumulated value stored in first accumulator buffer 550(1) replaces the accumulated value stored in the second accumulator buffer 550(2) at the end of the first convolution cycle 530(1), at the end of the second convolution cycle 530(2), and at the end of the third convolution cycle 530(3). In some examples, the accumulated value stored in the second accumulated buffer at the end of each convolution cycle replaces an accumulated value stored in a third accumulator buffer at the end of each convolution cycle. For instance, the accumulated value stored in second accumulator buffer 550(2) replaces the value stored in third accumulator buffer 550(3) at the end of the first convolution cycle 530(1), at the end of the second convolution cycle 530(2), and at the end of the third convolution cycle 530(3).

In some examples, during each convolution cycle of the plurality of convolution cycles, each accumulator buffer of a plurality of accumulator buffers corresponding to a plurality of multiplier CUs receives a first input from a corresponding memory location, the first input indicative of a pixel value within the row of image data, and receives a second input from an adjacent accumulator buffer of the plurality of accumulator buffers, the second input indicative of an accumulated value stored in the adjacent accumulator buffer. In some examples, each accumulator buffer receives the first input at a beginning of each convolution cycle and receives the second input at an end of each convolution cycle.

For instance, during the first convolution cycle 530(1) of FIG. 5, the first accumulator buffer 550(1) receives a first input from the multiplier CU 540(1) corresponding to the pixel value 0. The first accumulator buffer 550(1), at the end of the first convolution cycle 530(1), receives a second input from the adjacent accumulator buffer 550(4). In another example, during the first convolution cycle 530(1) of FIG. 5, the second accumulator buffer 550(2) receives a first input from the multiplier CU 550(2) corresponding to the pixel value 1. The second accumulator buffer 550(2), at the end of the first convolution cycle 530(1), receives a second input from the adjacent accumulator buffer 550(1).

At block 710, the process 700 includes updating a memory location used to store a first value not included in the plurality of second values with the additional second value, wherein the updated memory location stores the additional second value. For instance, in the first convolution cycle 430(1) of FIG. 4, a memory location is used to store the input data value '0'. The first convolution cycle 430(1) is associated with the first respective values 0, 1, 2, 3 (e.g., as described above). The second convolution cycle 430(2) is associated with the second respective values 1, 2, 3, 4 (e.g., as described above). The input data value '0' is a first value not included in the plurality of second values, and the input data value '4' is an additional second value not included in the first plurality of values.

At the end of the first convolution cycle 430(1), the memory location used to store the first value '0' that is not included in the second plurality of values can be replaced with the additional second value '4' that is used for the second convolution cycle 430(2). The updated memory location then stores the value '4' at the beginning of the second convolution cycle 430(2). The memory locations used to store the respective values 1, 2, and 3 that are included in both the first and second plurality of values are unchanged between the first and second convolution cycles 430(1) and 430(2). After the second convolution cycle 430(2), the memory location used to store the value '1' is updated to store the additional value '5' that will be newly used by the third convolution cycle 430(3). The memory locations used to store the values 2, 3, and 4 are unchanged between the second and third convolution cycles 430(2) and 430(3).

In some aspects, the process 700 includes updating an accumulated value corresponding to the convolution output for the first position of the plurality of positions of the convolution kernel using a first accumulator buffer at an end of each convolution cycle of the plurality of convolution cycles. For instance, the first accumulator buffer can be updated based on an output of the first multiplier CU for the first convolution cycle of the plurality of convolution cycles. The first accumulator buffer can additionally be updated based on an output of the second multiplier CU for the second convolution cycle of the plurality of convolution cycles. In some cases, the accumulated value of the first accumulator buffer can be updated based on a respective output of a different multiplier CU for each convolution cycle of the plurality of convolution cycles. For instance, the accumulated value of the first accumulator buffer can be updated based on a respective output of a different multiplier CU for each location of a plurality of locations within the first position of the convolution kernel along the row of the image data. In some cases, each convolution cycle of the plurality of convolution cycles corresponds to a respective location of the plurality of locations within the first position of the convolution kernel along the row of the image data.

In some examples, the processes described herein (e.g., process 700, and/or any other process described herein) may be performed by a computing device, apparatus, or system. In some examples, the process 700 can be performed by a computing device or system having the computing device architecture 1000 of FIG. 10. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 700 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
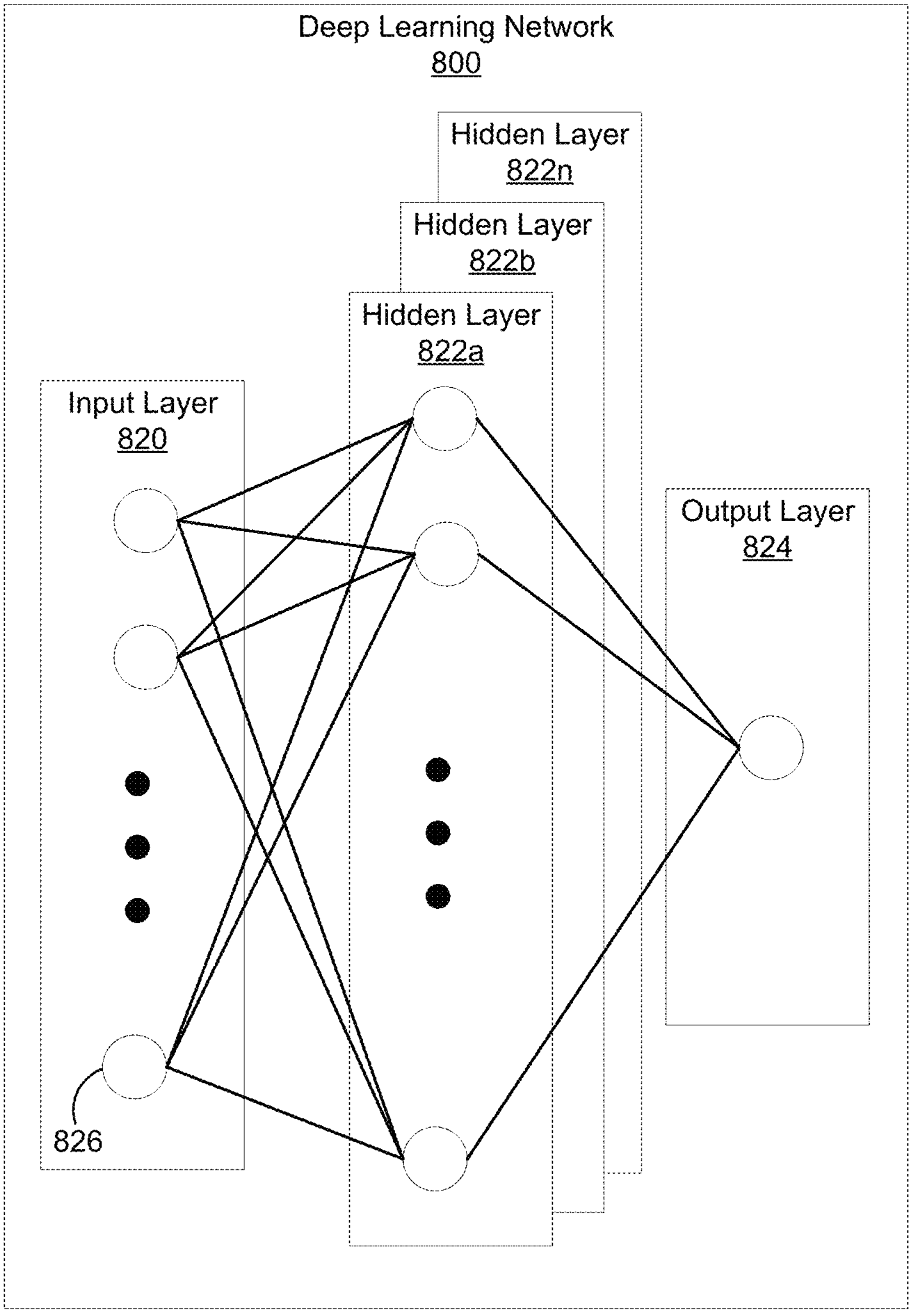
FIG. 8 is a block diagram illustrating an example of a deep learning network, in accordance with some examples.

FIG. 8 is an illustrative example of a deep learning neural network 800. An input layer 820 includes input data. In some cases, the input layer 820 can include data representing the pixels of an input video frame. The neural network 800 includes multiple hidden layers 822*a*, 822*b*, through 822*n*. The hidden layers 822*a*, 822*b*, through 822*n* include "n" number of hidden layers, where "n" is an integer greater than or equal to one. The number of hidden layers can be made to include as many layers as needed for the given application. The neural network 800 further includes an output layer 824 that provides an output resulting from the processing performed by the hidden layers 822*a*, 822*b*, through 822*n*. In some aspects, the output layer 824 can provide a classification for an object in an input video frame. The classification can include a class identifying the type of object (e.g., a person, a dog, a cat, or other object).

The neural network 800 is a multi-layer neural network of interconnected nodes. Each node can represent a piece of information. Information associated with the nodes is shared among the different layers and each layer retains information as information is processed. In some cases, the neural network 800 can include a feed-forward network, in which case there are no feedback connections where outputs of the network are fed back into itself. In some cases, the neural network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822*a*. For example, as shown, each of the input nodes of the input layer 820 is connected to each of the nodes of the first hidden layer 822*a*. The nodes of the hidden layers 822*a*, 822*b*, through 822*n* can transform the information of each input node by applying activation functions to the information. The information derived from the transformation can then be passed to and can activate the nodes of the next hidden layer 822*b*, which can perform their own designated functions. Example functions include convolutional, up-sampling, data transformation, and/or any other suitable functions. The output of the hidden layer 822*b* can then activate nodes of the next hidden layer, and so on. The output of the last hidden layer 822*n* can activate one or more nodes of the output layer 824, at which an output is provided. In some cases, while nodes (e.g., node 826) in the neural network 800 are shown as having multiple output lines, a node has a single output and all lines shown as being output from a node represent the same output value.

In some cases, each node or interconnection between nodes can have a weight that is a set of parameters derived from the training of the neural network 800. Once the neural network 800 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 820 using the different hidden layers 822*a*, 822*b*, through 822*n* in order to provide the output through the output layer 824. In an example in which the neural network 800 is used to identify objects in images, the neural network 800 can be trained using training data that includes both images and labels. For instance, training images can be input into the network, with each training image having a label indicating the classes of the one or more objects in each image (basically, indicating to the network what the objects are and what features they have). In some examples, a training image can include an image of a number 2, in which case the label for the image can be [0 0 1 0 0 0 0 0 0 0].

In some cases, the neural network 800 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 800 is trained well enough so that the weights of the layers are accurately tuned.

For the example of identifying objects in images, the forward pass can include passing a training image through the neural network 800. The weights are initially randomized before the neural network 800 is trained. The image can include, for example, an array of numbers representing the pixels of the image. Each number in the array can include a value from 0 to 255 describing the pixel intensity at that position in the array. In some examples, the array can include a 28×28×3 array of numbers with 28 rows and 28 columns of pixels and 3 color components (such as red, green, and blue, or luma and two chroma components, or the like).

For a first training iteration for the neural network 800, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 800 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma\frac{1}{2}(\text{target}-\text{output})^2$, which calculates the sum of one-half times a ground truth output (e.g., the actual answer) minus the predicted output (e.g., the predicted answer) squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 800 can perform a backward pass by determining which inputs (weights) most contributed to the loss of the network, and can adjust the weights so that the loss decreases and is eventually minimized.

A derivative of the loss with respect to the weights (denoted as dl/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 800 can include any suitable deep network. One example includes a convolutional neural network (CNN), which includes an input layer and an output layer, with multiple hidden layers between the input and out layers. An example of a CNN is described below with respect to FIG. 9. The hidden layers of a CNN include a series of convolutional, nonlinear, pooling (for downsampling), and fully connected layers. The neural network 800 can include any other deep network other than a CNN, such as an autoencoder, a deep belief nets (DBNs), a Recurrent Neural Networks (RNNs), among others.

Figure 9:
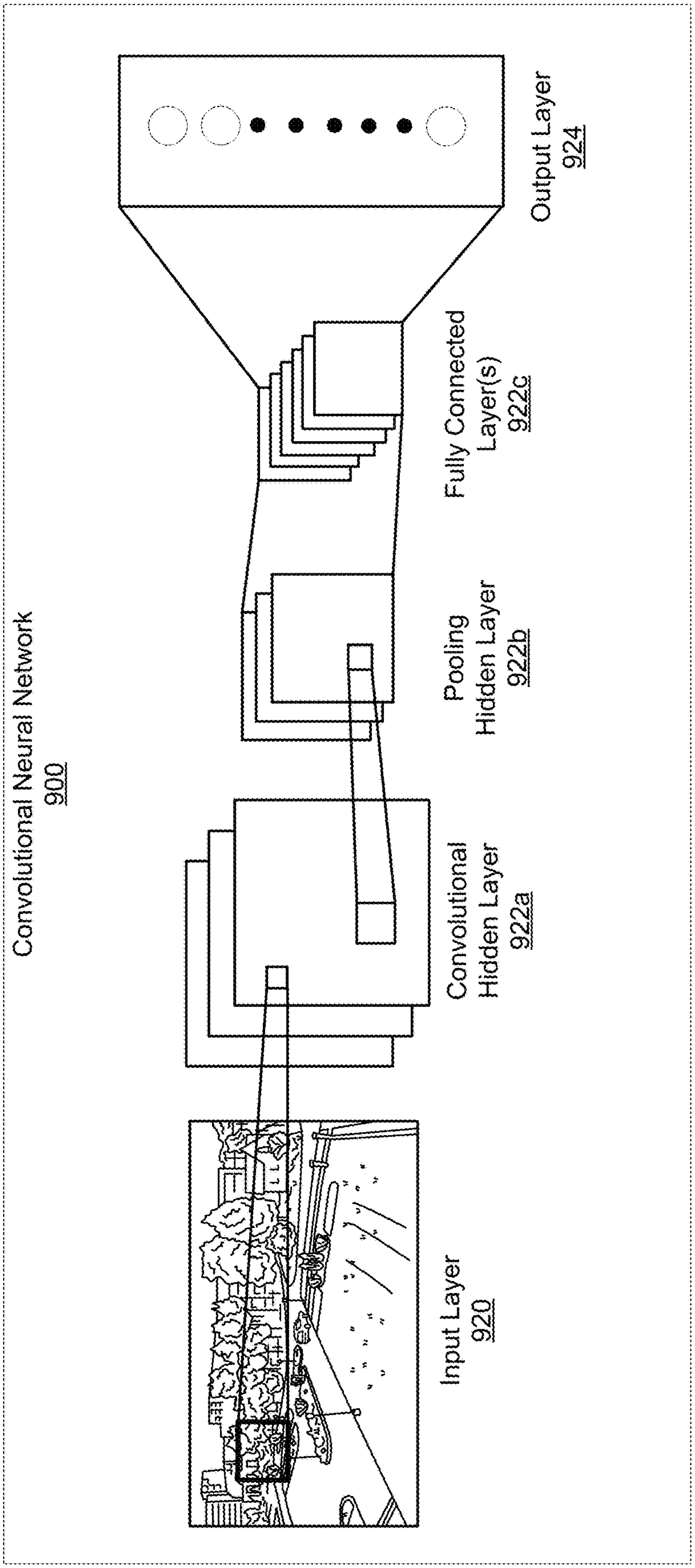
FIG. 9 is a block diagram illustrating an example of a convolutional neural network, in accordance with some examples.

FIG. 9 is an illustrative example of a convolutional neural network 900 (CNN 900). The input layer 920 of the CNN 900 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 922*a*, an optional non-linear activation layer, a pooling hidden layer 922*b*, and fully connected hidden layers 922*c* to get an output at the output layer 924. While only one of each hidden layer is shown in FIG. 9, one of ordinary skill will appreciate that multiple convolutional hidden layers, non-linear layers, pooling hidden layers, and/or fully connected layers can be included in the CNN 900. As previously described, the output can indicate a single class of an object or can include a probability of classes that best describe the object in the image.

The first layer of the CNN 900 is the convolutional hidden layer 922*a*. The convolutional hidden layer 922*a* analyzes the image data of the input layer 920. Each node of the convolutional hidden layer 922*a* is connected to a region of nodes (pixels) of the input image called a receptive field. The convolutional hidden layer 922*a* can be considered as one or more filters (each filter corresponding to a different activation or feature map), with each convolutional iteration of a filter being a node or neuron of the convolutional hidden layer 922*a*. For example, the region of the input image that a filter covers at each convolutional iteration would be the receptive field for the filter. In some aspects, if the input image includes a 28×28 array, and each filter (and corresponding receptive field) is a 5×5 array, then there will be 24×24 nodes in the convolutional hidden layer 922*a*. Each connection between a node and a receptive field for that node learns a weight and, in some cases, an overall bias such that each node learns to analyze its particular local receptive field in the input image. Each node of the hidden layer 922*a* will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 922*a* is due to each node of the convolutional layer being applied to its corresponding receptive field. For example, a filter of the convolutional hidden layer 922*a* can begin in the top-left corner of the input image array and can convolve around the input image. As noted above, each convolutional iteration of the filter can be considered a node or neuron of the convolutional hidden layer 922*a*. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 922*a*.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 922*a*.

The mapping from the input layer to the convolutional hidden layer 922*a* is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 922*a* can include several activation maps in order to identify multiple features in an image. The example shown in FIG. 9 includes three activation maps. Using three activation maps, the convolutional hidden layer 922*a* can detect three different kinds of features, with each feature being detectable across the entire image.

In some examples, a non-linear hidden layer can be applied after the convolutional hidden layer 922*a*. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 900 without affecting the receptive fields of the convolutional hidden layer 922*a*.

The pooling hidden layer 922*b* can be applied after the convolutional hidden layer 922*a* (and after the non-linear hidden layer when used). The pooling hidden layer 922*b* is used to simplify the information in the output from the convolutional hidden layer 922*a*. For example, the pooling hidden layer 922*b* can take each activation map output from the convolutional hidden layer 922*a* and generates a condensed activation map (or feature map) using a pooling function. Max-pooling is one example of a function performed by a pooling hidden layer. Other forms of pooling functions be used by the pooling hidden layer 922*a*, such as average pooling, L2-norm pooling, or other suitable pooling functions. A pooling function (e.g., a max-pooling filter, an L2-norm filter, or other suitable pooling filter) is applied to each activation map included in the convolutional hidden layer 922*a*. In the example shown in FIG. 9, three pooling filters are used for the three activation maps in the convolutional hidden layer 922*a*.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 922*a*. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 922*a* having a dimension of 24×24 nodes, the output from the pooling hidden layer 922*b* will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 900.

The final layer of connections in the network is a fully-connected layer that connects every node from the pooling hidden layer 922*b* to every one of the output nodes in the output layer 924. Using the example above, the input layer includes 28×28 nodes encoding the pixel intensities of the input image, the convolutional hidden layer 922*a* includes 3×24×24 hidden feature nodes based on application of a 5×5 local receptive field (for the filters) to three activation maps, and the pooling layer 922*b* includes a layer of 3×12×12 hidden feature nodes based on application of max-pooling filter to 2×2 regions across each of the three feature maps. Extending this example, the output layer 924 can include ten output nodes. In such an example, every node of the 3×12×12 pooling hidden layer 922*b* is connected to every node of the output layer 924.

The fully connected layer 922*c* can obtain the output of the previous pooling layer 922*b* (which should represent the activation maps of high-level features) and determines the features that most correlate to a particular class. For example, the fully connected layer 922*c* layer can determine the high-level features that most strongly correlate to a particular class, and can include weights (nodes) for the high-level features. A product can be computed between the weights of the fully connected layer 922*c* and the pooling hidden layer 922*b* to obtain probabilities for the different classes. For example, if the CNN 900 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 924 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In some cases, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 10:
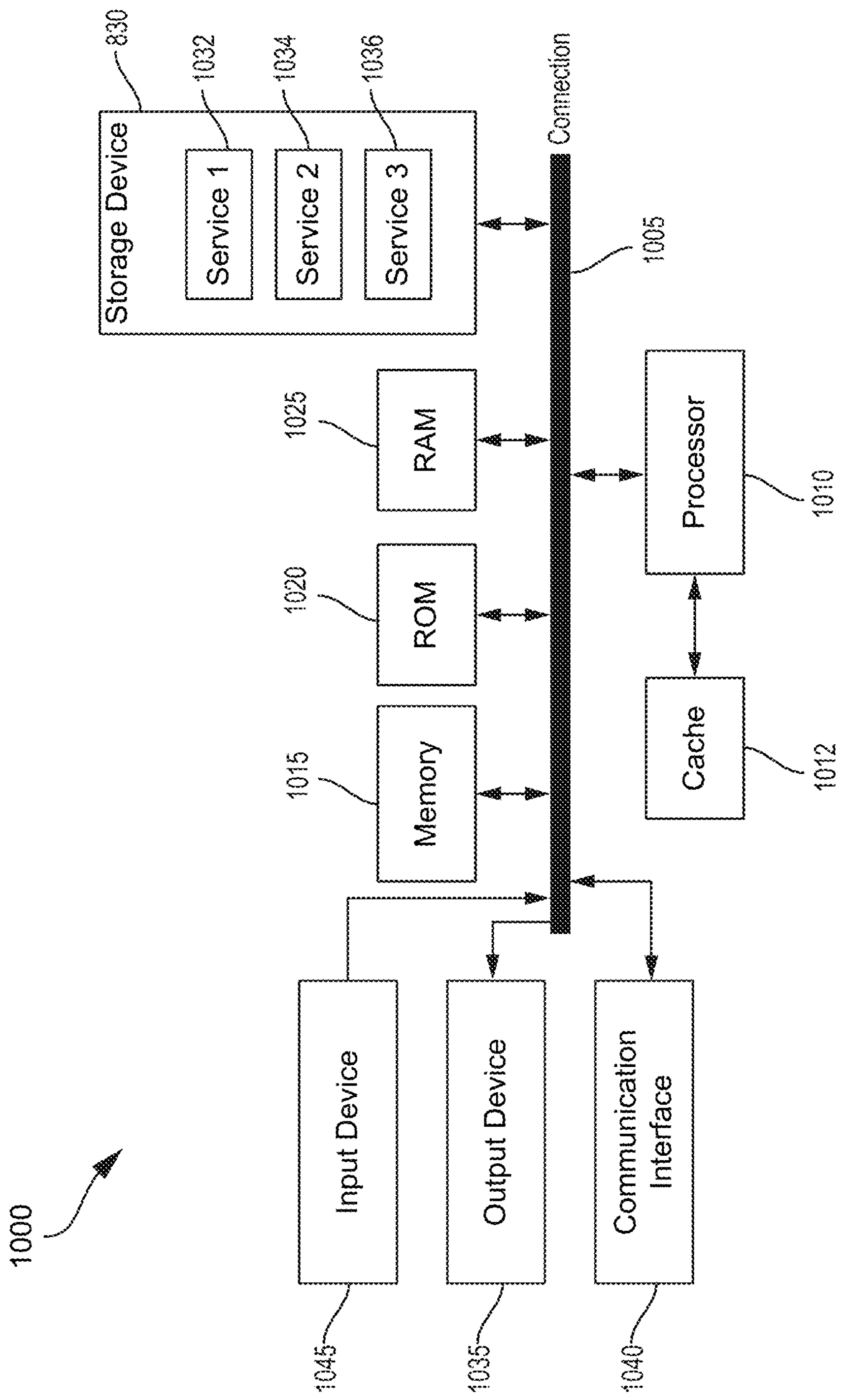
FIG. 10 is a diagram illustrating an example system architecture for implementing certain aspects described herein.

FIG. 10 illustrates an example computing device architecture 1000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 1000 are shown in electrical communication with each other using connection 1005, such as a bus. The example computing device architecture 1000 includes a processing unit (CPU or processor) 1010 and computing device connection 1005 that couples various computing device components including computing device memory 1015, such as read only memory (ROM) 1020 and random-access memory (RAM) 1025, to processor 1010.

Computing device architecture 1000 can include a cache of high-speed memory connected directly with, in close proximity to, or integrated as part of processor 1010. Computing device architecture 1000 can copy data from memory 1015 and/or the storage device 1030 to cache 1012 for quick access by processor 1010. In this way, the cache can provide a performance boost that avoids processor 1010 delays while waiting for data. These and other engines can control or be configured to control processor 1010 to perform various actions. Other computing device memory 1015 may be available for use as well. Memory 1015 can include multiple different types of memory with different performance characteristics. Processor 1010 can include any general-purpose processor and a hardware or software service, such as service 1 1032, service 2 1034, and service 3 1036 stored in storage device 1030, configured to control processor 1010 as well as a special-purpose processor where software instructions are incorporated into the processor design. Processor 1010 may be a self-contained system, containing multiple cores or processors, a bus, memory controller, cache, etc. A multi-core processor may be symmetric or asymmetric.

To enable user interaction with the computing device architecture 1000, input device 1045 can represent any number of input mechanisms, such as a microphone for speech, a touch-sensitive screen for gesture or graphical input, keyboard, mouse, motion input, speech and so forth. Output device 1035 can also be one or more of a number of output mechanisms known to those of skill in the art, such as a display, projector, television, speaker device, etc. In some instances, multimodal computing devices can enable a user to provide multiple types of input to communicate with computing device architecture 1000. Communication interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. Storage device 1030 can include services 1032, 1034, 1036 for controlling processor 1010. Other hardware or software modules or engines are contemplated. Storage device 1030 can be connected to the computing device connection 1005. In some aspects, a hardware module that performs a particular function can include the software component stored in a computer-readable medium in connection with the necessary hardware components, such as processor 1010, connection 1005, output device 1035, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Illustrative aspects of the disclosure include:

Aspect 1. An apparatus for processing image data, comprising: at least one memory; and at least one processor coupled to the at least one memory, the at least one processor configured to: obtain a respective first value enclosed by a convolution kernel in each position of a plurality of positions of the convolution kernel along a row of the image data; store each respective first value using a respective memory location associated with each position of the plurality of positions of the convolution kernel; update, based on each respective first value stored using the respective memory location, an accumulated value corresponding to a convolution output for each position of the plurality of positions of the convolution kernel; obtain a plurality of second values enclosed by the convolution kernel in each position of the plurality of positions, wherein the plurality of second values includes a subset of the respective first values and an additional second value not included in the respective first values; and update a memory location used to store a first value not included in the plurality of second values with the additional second value, wherein the updated memory location stores the additional second value.

Aspect 2. The apparatus of Aspect 1, wherein, to update the accumulated value, the at least one processor is configured to: perform, using a compute unit (CU) for each respective memory location, a respective multiplier-accumulator (MAC) operation using the respective first value stored using the respective memory location; and provide an output of each respective MAC operation to an accumulator buffer associated with the CU for each respective memory location.

Aspect 3. The apparatus of any of Aspects 1 to 2, wherein the at least one processor is configured to determine the convolution output for each position of the plurality of positions of the convolution kernel based on a plurality of convolution cycles, each convolution cycle of the plurality of convolution cycles corresponding to a different location within the convolution kernel.

Aspect 4. The apparatus of Aspect 3, wherein: a first convolution cycle corresponds to the respective first value enclosed by the convolution kernel, each respective first value corresponding to a first location within the convolution kernel; and a second convolution cycle corresponds to the plurality of second values enclosed by the convolution kernel, each respective second value of the plurality of second values corresponding to a second location within the convolution kernel, the second location adjacent to the first location.

Aspect 5. The apparatus of any of Aspects 3 to 4, wherein the convolution output for each position of the plurality of positions of the convolution kernel along the row of the image data is associated with a different multiplier compute unit (CU) for each convolution cycle of the plurality of convolution cycles.

Aspect 6. The apparatus of Aspect 5, wherein the convolution output for a first position of the plurality of positions is associated with: a first multiplier CU for a first convolution cycle of the plurality of convolution cycles, wherein the first multiplier CU is associated with a first memory location used to store the respective first value for the first position of the convolution kernel; and a second multiplier CU for a second convolution cycle of the plurality of convolution cycles, wherein the second multiplier CU is associated with a second memory location used to store a respective second value included in the subset of first values.

Aspect 7. The apparatus of Aspect 6, wherein an output of the first multiplier CU is stored in a first accumulator buffer for each convolution cycle of the plurality of convolution cycles, and wherein an output of the second multiplier CU is stored in a second accumulator buffer for each convolution cycle of the plurality of convolution cycles.

Aspect 8. The apparatus of Aspect 7, wherein: an accumulated value stored in the first accumulator buffer at an end of each convolution cycle replaces an accumulated value stored in the second accumulator buffer at the end of each convolution cycle; and the accumulated value stored in the second accumulated buffer at the end of each convolution cycle replaces an accumulated value stored in a third accumulator buffer at the end of each convolution cycle.

Aspect 9. The apparatus of any of Aspects 7 to 8, wherein during each convolution cycle of the plurality of convolution cycles, each accumulator buffer of a plurality of accumulator buffers corresponding to a plurality of multiplier CUs receives: a first input from a corresponding memory location, the first input indicative of a pixel value within the row of image data; and a second input from an adjacent accumulator buffer of the plurality of accumulator buffers, the second input indicative of an accumulated value stored in the adjacent accumulator buffer.

Aspect 10. The apparatus of Aspect 9, wherein each accumulator buffer receives the first input at a beginning of each convolution cycle and receives the second input at an end of each convolution cycle.

Aspect 11. The apparatus of any of Aspects 6 to 10, wherein the at least one processor is configured to: update an accumulated value corresponding to the convolution output for the first position of the plurality of positions of the convolution kernel using a first accumulator buffer at an end of each convolution cycle of the plurality of convolution cycles.

Aspect 12. The apparatus of Aspect 11, wherein the at least one processor is configured to: update the first accumulator buffer based on an output of the first multiplier CU for the first convolution cycle of the plurality of convolution cycles; and update the first accumulator buffer based on an output of the second multiplier CU for the second convolution cycle of the plurality of convolution cycles.

Aspect 13. The apparatus of any of Aspects 11 to 12, wherein the at least one processor is configured to: update the accumulated value of the first accumulator buffer based on a respective output of a different multiplier CU for each convolution cycle of the plurality of convolution cycles.

Aspect 14. The apparatus of Aspect 13, wherein the at least one processor is configured to: update the accumulated value of the first accumulator buffer based on a respective output of a different multiplier CU for each location of a plurality of locations within the first position of the convolution kernel along the row of the image data.

Aspect 15. The apparatus of Aspect 14, wherein each convolution cycle of the plurality of convolution cycles corresponds to a respective location of the plurality of locations within the first position of the convolution kernel along the row of the image data.

Aspect 16. A method for processing image data, comprising: obtaining a respective first value enclosed by a convolution kernel in each position of a plurality of positions of the convolution kernel along a row of the image data; storing each respective first value using a respective memory location associated with each position of the plurality of positions of the convolution kernel; updating, based on each respective first value stored using the respective memory location, an accumulated value corresponding to a convolution output for each position of the plurality of positions of the convolution kernel; obtaining a plurality of second values enclosed by the convolution kernel in each position of the plurality of positions, wherein the plurality of second values includes a subset of the respective first values and an additional second value not included in the respective first values; and updating a memory location used to store a first value not included in the plurality of second values with the additional second value, wherein the updated memory location stores the additional second value.

Aspect 17. The method of Aspect 16, wherein updating the accumulated value comprises: performing, using a compute unit (CU) for each respective memory location, a respective multiplier-accumulator (MAC) operation using the respective first value stored using the respective memory location; and providing an output of each respective MAC operation to an accumulator buffer associated with the CU for each respective memory location.

Aspect 18. The method of any of Aspects 16 to 17, further comprising determining the convolution output for each position of the plurality of positions of the convolution kernel based on a plurality of convolution cycles, each convolution cycle of the plurality of convolution cycles corresponding to a different location within the convolution kernel.

Aspect 19. The method of Aspect 18, wherein: a first convolution cycle corresponds to the respective first value enclosed by the convolution kernel, each respective first value corresponding to a first location within the convolution kernel; and a second convolution cycle corresponds to the plurality of second values enclosed by the convolution kernel, each respective second value of the plurality of second values corresponding to a second location within the convolution kernel, the second location adjacent to the first location.

Aspect 20. The method of any of Aspects 18 to 19, wherein the convolution output for each position of the plurality of positions of the convolution kernel along the row of the image data is associated with a different multiplier compute unit (CU) for each convolution cycle of the plurality of convolution cycles.

Aspect 21. The method of Aspect 20, wherein the convolution output for a first position of the plurality of positions is associated with: a first multiplier CU for a first convolution cycle of the plurality of convolution cycles, wherein the first multiplier CU is associated with a first memory location used to store the respective first value for the first position of the convolution kernel; and a second multiplier CU for a second convolution cycle of the plurality of convolution cycles, wherein the second multiplier CU is associated with a second memory location used to store a respective second value included in the subset of first values.

Aspect 22. The method of Aspect 21, wherein an output of the first multiplier CU is stored in a first accumulator buffer for each convolution cycle of the plurality of convolution cycles, and wherein an output of the second multiplier CU is stored in a second accumulator buffer for each convolution cycle of the plurality of convolution cycles.

Aspect 23. The method of Aspect 22, wherein: an accumulated value stored in the first accumulator buffer at an end of each convolution cycle replaces an accumulated value stored in the second accumulator buffer at the end of each convolution cycle; and the accumulated value stored in the second accumulated buffer at the end of each convolution cycle replaces an accumulated value stored in a third accumulator buffer at the end of each convolution cycle.

Aspect 24. The method of any of Aspects 22 to 23, wherein during each convolution cycle of the plurality of convolution cycles, each accumulator buffer of a plurality of accumulator buffers corresponding to a plurality of multiplier CUs receives: a first input from a corresponding memory location, the first input indicative of a pixel value within the row of image data; and a second input from an adjacent accumulator buffer of the plurality of accumulator buffers, the second input indicative of an accumulated value stored in the adjacent accumulator buffer.

Aspect 25. The method of Aspect 24, wherein each accumulator buffer receives the first input at a beginning of each convolution cycle and receives the second input at an end of each convolution cycle.

Aspect 26. The method of any of Aspects 21 to 25, further comprising: updating an accumulated value corresponding to the convolution output for the first position of the plurality of positions of the convolution kernel using a first accumulator buffer at an end of each convolution cycle of the plurality of convolution cycles.

Aspect 27. The method of Aspect 26, further comprising: updating the first accumulator buffer based on an output of the first multiplier CU for the first convolution cycle of the plurality of convolution cycles; and updating the first accumulator buffer based on an output of the second multiplier CU for the second convolution cycle of the plurality of convolution cycles.

Aspect 28. The method of any of Aspects 26 to 27, further comprising: updating the accumulated value of the first accumulator buffer based on a respective output of a different multiplier CU for each convolution cycle of the plurality of convolution cycles.

Aspect 29. The method of Aspect 28, further comprising: updating the accumulated value of the first accumulator buffer based on a respective output of a different multiplier CU for each location of a plurality of locations within the first position of the convolution kernel along the row of the image data.

Aspect 30. The method of Aspect 29, wherein each convolution cycle of the plurality of convolution cycles corresponds to a respective location of the plurality of locations within the first position of the convolution kernel along the row of the image data.

Aspect 31. A non-transitory computer-readable storage medium comprising instructions stored thereon which, when executed by at least one processor, causes the at least one processor to perform operations according to any of Aspects 1 to 15.

Aspect 32. A non-transitory computer-readable storage medium comprising instructions stored thereon which, when executed by at least one processor, causes the at least one processor to perform operations according to any of Aspects 16 to 30.

Aspect 33. An apparatus comprising one or more means for performing operations according to any of Aspects 1 to 15.

Aspect 34. An apparatus comprising one or more means for performing operations according to any of Aspects 16 to 30.

What is claimed is:

1. An apparatus for processing image data, comprising:

at least one memory; and at least one processor coupled to the at least one memory, the at least one processor configured to:

obtain a plurality of first values enclosed by a convolution kernel in each position of a plurality of positions of the convolution kernel along a row of the image data during a first convolution cycle;

store each first value of the plurality of first values using a respective memory location of a plurality of memory locations, each respective memory location corresponding to a respective position of the plurality of positions of the convolution kernel;

update, based on each first value of the plurality of first values stored using the respective memory location, an accumulated value corresponding to a convolution output for each position of the plurality of positions of the convolution kernel;

obtain a plurality of second values enclosed by the convolution kernel in each position of the plurality of positions during a second convolution cycle after the first convolution cycle, wherein the plurality of second values comprises a subset of the plurality of first values that remain enclosed by the convolution kernel during the second convolution cycle and an additional value that is not included in the plurality of first values and is newly enclosed by the convolution kernel during the second convolution cycle; and update a particular memory location of the plurality of memory locations to overwrite a stored first value of the plurality of first values that is not included in the plurality of second values with the additional value, wherein after the update the particular memory location stores the additional value, and wherein the respective memory locations used to store the first values in the subset are unchanged between the first and second convolution cycles.

2. The apparatus of claim 1, wherein, to update the accumulated value, the at least one processor is configured to:

perform, using a compute unit (CU) for each respective memory location, a respective multiplier-accumulator (MAC) operation using the first value of the plurality of first values that is stored using the respective memory location; and provide an output of each respective MAC operation to an accumulator buffer associated with the CU for each respective memory location.

3. The apparatus of claim 1, wherein the at least one processor is configured to determine the convolution output for each position of the plurality of positions of the convolution kernel based on a plurality of convolution cycles, each convolution cycle of the plurality of convolution cycles corresponding to a different location within the convolution kernel.

4. The apparatus of claim 3, wherein:

the first convolution cycle corresponds to the plurality of first values enclosed by the convolution kernel, each first value of the plurality of first values corresponding to a first location within the convolution kernel; and the second convolution cycle corresponds to the plurality of second values enclosed by the convolution kernel, each respective second value of the plurality of second values corresponding to a second location within the convolution kernel, the second location adjacent to the first location.

5. The apparatus of claim 3, wherein the convolution output for each position of the plurality of positions of the convolution kernel along the row of the image data is associated with a different multiplier compute unit (CU) for each convolution cycle of the plurality of convolution cycles.

6. The apparatus of claim 5, wherein the convolution output for a first position of the plurality of positions is associated with:

a first multiplier CU for the first convolution cycle of the plurality of convolution cycles, wherein the first multiplier CU is associated with a first memory location used to store a particular first value of the plurality of first values for the first position of the convolution kernel; and a second multiplier CU for the second convolution cycle of the plurality of convolution cycles, wherein the second multiplier CU is associated with a second memory location used to store a particular second value included in the subset of the plurality of first values.

7. The apparatus of claim 6, wherein an output of the first multiplier CU is stored in a first accumulator buffer for each convolution cycle of the plurality of convolution cycles, and wherein an output of the second multiplier CU is stored in a second accumulator buffer for each convolution cycle of the plurality of convolution cycles.

8. The apparatus of claim 7, wherein:

an accumulated value stored in the first accumulator buffer at an end of each convolution cycle replaces an accumulated value stored in the second accumulator buffer at the end of each convolution cycle; and the accumulated value stored in the second accumulator buffer at the end of each convolution cycle replaces an accumulated value stored in a third accumulator buffer at the end of each convolution cycle.

9. The apparatus of claim 7, wherein during each convolution cycle of the plurality of convolution cycles, each accumulator buffer of a plurality of accumulator buffers corresponding to a plurality of multiplier CUs receives:

a first input from a corresponding memory location, the first input indicative of a pixel value within the row of image data; and a second input from an adjacent accumulator buffer of the plurality of accumulator buffers, the second input indicative of an accumulated value stored in the adjacent accumulator buffer.

10. The apparatus of claim 9, wherein each accumulator buffer receives the first input at a beginning of each convolution cycle and receives the second input at an end of each convolution cycle.

11. The apparatus of claim 6, wherein the at least one processor is configured to:

update an accumulated value corresponding to the convolution output for the first position of the plurality of positions of the convolution kernel using a first accumulator buffer at an end of each convolution cycle of the plurality of convolution cycles.

12. The apparatus of claim 11, wherein the at least one processor is configured to:

update the first accumulator buffer based on an output of the first multiplier CU for the first convolution cycle of the plurality of convolution cycles; and update the first accumulator buffer based on an output of the second multiplier CU for the second convolution cycle of the plurality of convolution cycles.

13. The apparatus of claim 11, wherein the at least one processor is configured to:

update the accumulated value of the first accumulator buffer based on a respective output of a different multiplier CU for each convolution cycle of the plurality of convolution cycles.

14. The apparatus of claim 13, wherein the at least one processor is configured to:

update the accumulated value of the first accumulator buffer based on a respective output of a different multiplier CU for each location of a plurality of locations within the first position of the convolution kernel along the row of the image data.

15. The apparatus of claim 14, wherein each convolution cycle of the plurality of convolution cycles corresponds to a respective location of the plurality of locations within the first position of the convolution kernel along the row of the image data.

16. A method for processing image data, comprising:

obtaining a plurality of first values enclosed by a convolution kernel in each position of a plurality of positions of the convolution kernel along a row of the image data during a first convolution cycle;

storing each first value of the plurality of first values using a respective memory location of a plurality of memory locations, each respective memory location corresponding to a respective position of the plurality of positions of the convolution kernel;

updating, based on each first value of the plurality of first values stored using the respective memory location, an accumulated value corresponding to a convolution output for each position of the plurality of positions of the convolution kernel;

obtaining a plurality of second values enclosed by the convolution kernel in each position of the plurality of positions during a second convolution cycle after the first convolution cycle, wherein the plurality of second values comprises a subset of the plurality of first values that remain enclosed by the convolution kernel during the second convolution cycle and an additional value that is not included in the plurality of first values and is newly enclosed by the convolution kernel during the second convolution cycle; and updating a particular memory location of the plurality of memory locations to overwrite a stored first value of the plurality of first values that is not included in the plurality of second values with the additional value, wherein after the update the particular memory location stores the additional value, and wherein the respective memory locations used to store the first values in the subset are unchanged between the first and second convolution cycles.

17. The method of claim 16, wherein updating the accumulated value comprises:

performing, using a compute unit (CU) for each memory location, a respective multiplier-accumulator (MAC) operation using the respective first value of the plurality of first values that is stored using the respective memory location; and providing an output of each respective MAC operation to an accumulator buffer associated with the CU for each respective memory location.

18. The method of claim 16, further comprising determining the convolution output for each position of the plurality of positions of the convolution kernel based on a plurality of convolution cycles, each convolution cycle of the plurality of convolution cycles corresponding to a different location within the convolution kernel.

19. The method of claim 18, wherein:

the first convolution cycle corresponds to the plurality of first values enclosed by the convolution kernel, each first value of the plurality of first values corresponding to a first location within the convolution kernel; and the second convolution cycle corresponds to the plurality of second values enclosed by the convolution kernel, each second value of the plurality of second values corresponding to a second location within the convolution kernel, the second location adjacent to the first location.

20. The method of claim 18, wherein the convolution output for each position of the plurality of positions of the convolution kernel along the row of the image data is associated with a different multiplier compute unit (CU) for each convolution cycle of the plurality of convolution cycles.

21. The method of claim 20, wherein the convolution output for a first position of the plurality of positions is associated with:

a first multiplier CU for the first convolution cycle of the plurality of convolution cycles, wherein the first multiplier CU is associated with a first memory location used to store a particular first value of the plurality of first values for the first position of the convolution kernel; and a second multiplier CU for the second convolution cycle of the plurality of convolution cycles, wherein the second multiplier CU is associated with a second memory location used to store a particular second value included in the subset of the plurality of first values.

22. The method of claim 21, wherein an output of the first multiplier CU is stored in a first accumulator buffer for each convolution cycle of the plurality of convolution cycles, and wherein an output of the second multiplier CU is stored in a second accumulator buffer for each convolution cycle of the plurality of convolution cycles.

23. The method of claim 22, wherein:

an accumulated value stored in the first accumulator buffer at an end of each convolution cycle replaces an accumulated value stored in the second accumulator buffer at the end of each convolution cycle; and the accumulated value stored in the second accumulator buffer at the end of each convolution cycle replaces an accumulated value stored in a third accumulator buffer at the end of each convolution cycle.

24. The method of claim 22, wherein during each convolution cycle of the plurality of convolution cycles, each accumulator buffer of a plurality of accumulator buffers corresponding to a plurality of multiplier CUs receives:

a first input from a corresponding memory location, the first input indicative of a pixel value within the row of image data; and a second input from an adjacent accumulator buffer of the plurality of accumulator buffers, the second input indicative of an accumulated value stored in the adjacent accumulator buffer.

25. The method of claim 24, wherein each accumulator buffer receives the first input at a beginning of each convolution cycle and receives the second input at an end of each convolution cycle.

26. The method of claim 21, further comprising:

updating an accumulated value corresponding to the convolution output for the first position of the plurality of positions of the convolution kernel using a first accumulator buffer at an end of each convolution cycle of the plurality of convolution cycles.

27. The method of claim 26, further comprising:

updating the first accumulator buffer based on an output of the first multiplier CU for the first convolution cycle of the plurality of convolution cycles; and updating the first accumulator buffer based on an output of the second multiplier CU for the second convolution cycle of the plurality of convolution cycles.

28. The method of claim 26, further comprising:

updating the accumulated value of the first accumulator buffer based on a respective output of a different multiplier CU for each convolution cycle of the plurality of convolution cycles.

29. The method of claim 28, further comprising:

updating the accumulated value of the first accumulator buffer based on a respective output of a different multiplier CU for each location of a plurality of locations within the first position of the convolution kernel along the row of the image data.

30. The method of claim 29, wherein each convolution cycle of the plurality of convolution cycles corresponds to a respective location of the plurality of locations within the first position of the convolution kernel along the row of the image data.

* * * * *